(12) United States Patent
Botzas et al.

(10) Patent No.: US 10,074,320 B1
(45) Date of Patent: Sep. 11, 2018

(54) SUB-PIXEL REGION SPACER FOR ELECTROWETTING DISPLAY DEVICE

(71) Applicant: AMAZON TECHNOLOGIES, INC., Seattle, WA (US)

(72) Inventors: Anthony Botzas, Santa Clara, CA (US); Robert Waverly Zehner, Los Gatos, CA (US); Gerben Boon, Roermond (NL)

(73) Assignee: AMAZON TECHNOLOGIES, INC., Seattle, WA (US)

(*) Notice: Subject to any disclaimer, the term of this patent is extended or adjusted under 35 U.S.C. 154(b) by 35 days.

(21) Appl. No.: 15/087,665

(22) Filed: Mar. 31, 2016

(51) Int. Cl.
  *G09G 3/34* (2006.01)
  *G02B 26/00* (2006.01)

(52) U.S. Cl.
  CPC .......... *G09G 3/348* (2013.01); *G02B 26/005* (2013.01); *G02B 2207/115* (2013.01); *G09G 2300/0452* (2013.01); *G09G 2320/0673* (2013.01)

(58) Field of Classification Search
  CPC ....... G09G 3/348; G02B 26/00; G02B 26/005
  See application file for complete search history.

(56) References Cited

U.S. PATENT DOCUMENTS

| 2014/0029078 A1* | 1/2014 | Fennell | B81B 7/0058 359/238 |
| 2014/0063586 A1* | 3/2014 | Jung | G02B 26/005 359/290 |

\* cited by examiner

*Primary Examiner* — Jennifer Mehmood
*Assistant Examiner* — Sardis F Azongha
(74) *Attorney, Agent, or Firm* — Brinks Gilson & Lione

(57) ABSTRACT

A display device includes a first support plate and an opposing second support plate. A plurality of pixel regions is formed between the first support plate and the second support plate. Each pixel region includes a plurality of sub-pixel regions. A plurality of pixel wall portions over the first support plate form a perimeter of each of the plurality of sub-pixel regions. A sub-pixel region spacer is positioned in a first sub-pixel region of the plurality of sub-pixel regions. The sub-pixel region spacer includes a first spacer portion in the first sub-pixel region having a first landing surface extending between the plurality of pixel wall portions forming the perimeter of the first sub-pixel region. A second spacer portion of the sub-pixel region spacer extends from the second support plate in the first pixel region and is coupled to the first spacer portion.

21 Claims, 13 Drawing Sheets

US 10,074,320 B1

SUB-PIXEL REGION SPACER FOR ELECTROWETTING DISPLAY DEVICE

BACKGROUND

Electronic displays are found in numerous types of electronic devices including, without limitation, electronic book ("eBook") readers, mobile phones, laptop computers, desktop computers, televisions, appliances, automotive electronics, and augmented reality devices. Electronic displays may present various types of information, such as user interfaces, device operational status, digital content items, and the like, depending on the kind and purpose of the associated device. The appearance and quality of a display may affect a user's experience with the electronic device and the content presented thereon. Accordingly, finding ways to enhance user experience and satisfaction continues to be a priority. Moreover, increased multimedia use imposes high demands on designing, packaging, and fabricating display devices, as content available for mobile use becomes more extensive and device portability continues to be a high priority.

An electrowetting display includes an array of pixels individually bordered by pixel walls that retain fluid, e.g., a liquid such as an opaque oil, for example. Increased contact between a pixel wall and a respective spacer may maintain or improve performance and mechanical robustness of an electrowetting display panel. In at least some conventional electronic displays, inadequate spacers may allow the opposing support plates to move with respect to each other and, if such movement occurs at a high speed, considerable liquid flow between the plates may result, which may urge oil within one pixel to move to an adjacent pixel causing irreversible damage to the display panel.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
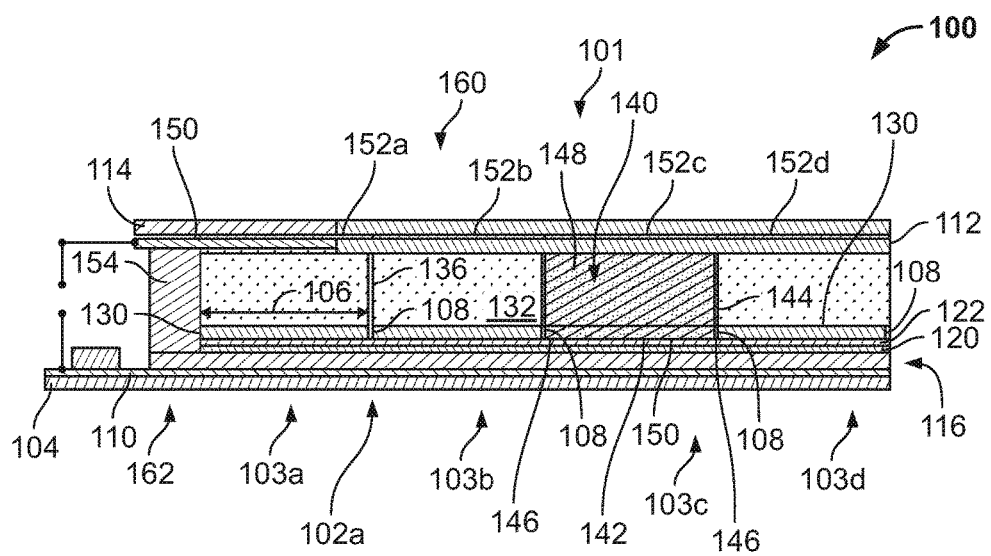
FIG. 1 is a cross-sectional view of a portion of an electrowetting display device, according to an example embodiment.

In example embodiments described herein, electronic devices, e.g., electrowetting display devices, include displays, e.g., electrowetting displays, which include spacers to provide a constant distance between a first or bottom support plate and a second or top support plate. The example spacers described herein and referred to as sub-pixel region spacers have a desired spacer pitch, e.g., at least 6 pixels, and provide sufficient mechanical strength with minimal negative effects on image quality and without any software compensation or dimming complexity. In at least some conventional electrowetting display devices, the electrowetting display device includes a pixel wall grid with one or more pixel wall portions of the pixel wall grid at least partially forming an associated pixel within a pixel region. A spacer extends from a top support plate of the electrowetting display device to couple with the respective pixel wall portion at least partially forming the associated pixel without extending into or interfering with an active area of the associated pixel. The spacers contribute to the mechanical strength of the electrowetting display device to maintain a desired distance between the top support plate and the opposing bottom support plate and prevent or limit damage of the electrowetting display due to undesirable impact, e.g., shock or point impact.

In example embodiments described herein, a plurality of sub-pixel region spacers extend from the top support plate into a respective sub-pixel region to completely fill the respective sub-pixel region. More specifically, in one embodiment, a first portion of the sub-pixel region is filled with a first spacer portion, including a suitable photoresist material, to a height of the surrounding sub-pixel walls to provide a landing surface for a corresponding second spacer portion extending from the top support plate in a second portion of the sub-pixel region. During a roll coupling process, the second spacer portion is coupled to the first spacer portion to form the sub-pixel region spacer. In example embodiments, the sub-pixel region spacer replaces a respective sub-pixel, e.g., a blue sub-pixel, in selected electrowetting sub-pixel regions in the patterned electrowetting display. In these example embodiments, the blue sub-pixel region is replaced with the sub-pixel region spacer because blue light emitted from the blue sub-pixel regions contributes the least luminance to a total luminance of the electrowetting display and the human eye has a relatively low acuity for blue light so it is difficult for the user to determine whether light is coming from a blue sub-pixel region. As a result, the loss of light by replacing some of the blue sub-pixel regions with a sub-pixel region spacer is easily compensated for by patterning the sub-pixel region spacer in the electrowetting display with a suitable sub-pixel region spacer pitch or increasing a luminance of one or more neighboring sub-pixel regions, e.g., a luminance of one or more neighboring red sub-pixel regions, green sub-pixel regions and/or white sub-pixel regions.

In various embodiments described herein, electronic devices, e.g., electrowetting display devices, include displays, e.g., electrowetting displays, for presenting content and other information. In some examples, the electrowetting display devices may include one or more components associated with the electrowetting display, such as a touch sensor component layered atop the electrowetting display for detecting touch inputs, a front light or a back light component for lighting the electrowetting display, and/or a cover layer component, which may have antiglare properties, antireflective properties, anti-fingerprint properties, anti-cracking properties, and/or the like. Various embodiments described herein include techniques for assembling electrowetting display devices including these components for the electrowetting displays and other features described herein.

An electrowetting pixel region includes a number of pixel walls that surround or are otherwise associated with at least a portion of the electrowetting pixel region, e.g., at least partially forming a pixel and/or a sub-pixel within the pixel region. The pixel walls form a structure that is configured to contain at least a portion of a first fluid, e.g., a liquid such as an opaque oil. Light transmission through the electrowetting pixel region can then be controlled by the application of an electric potential to the electrowetting pixel region, which results in a movement of a second fluid, e.g., a liquid such as an electrolyte liquid solution, into the electrowetting pixel, thereby displacing the first fluid. A pixel region may, unless otherwise specified, include an electrowetting element, one or more pixels, one or more pixels each including a plurality of sub-pixels, or one or more sub-pixels of an electrowetting display device, for example. Such an electrowetting element, pixel or sub-pixel may be the smallest light transmissive, reflective or transflective component of an electrowetting display that is individually operable to directly control an amount of light transmission through and/or reflection from the pixel region. For example, in some implementations, a pixel region may include a red sub-pixel region, a green sub-pixel region, a blue sub-pixel region, and a white sub-pixel region. In other implementations, a pixel region may include a plurality of pixels, wherein each pixel is a smallest component of the electrowetting display, i.e., the pixel does not include any sub-pixels.

As disclosed herein, a landing surface of a first spacer portion formed over a first or bottom support plate is shaped and positioned to align with a cooperating or complementary landing surface of a second spacer portion formed on a second or top support plate to form a sub-pixel region spacer. The contact between the first spacer portion and the second spacer portion provides a stable contact joint at an interface between the first spacer portion and the second spacer portion. The stable contact joint provides for improved mechanical strength at the interface and, overall, throughout the electrowetting display. In example embodiments, the landing surface of the first spacer portion is substantially identical to the landing surface of the second spacer portion. In the example embodiments, additional spacers extend from the second support plate to contact a portion of the pixel or sub-pixel wall surrounding one or more pixel regions or sub-pixel regions. The additional spacers have a contact surface at a distance from and parallel to the second support plate, that contacts a corresponding portion of the pixel wall. In various embodiments, the pixel wall and the spacers at least partially define an associated electrowetting pixel region and/or one or more adjacent electrowetting pixel regions.

An electronic display device, such as an electrowetting display device, may have a transmissive, reflective or transflective display that generally includes an array of pixel regions (e.g., which may comprise pixels and/or sub-pixels) configured to be operated by an active matrix addressing scheme. For example, rows and columns of electrowetting pixel regions are operated by controlling voltage levels on a plurality of source lines and a plurality of gate lines. In this configuration, the electronic display device may produce an image by selecting particular pixel regions to transmit, reflect or block light. Pixel regions are addressed (e.g., selected) via rows of source lines and columns of gate lines that are electrically connected to transistors (e.g., used as switches) included in each pixel region. Transistors take up a relatively small fraction of the area of each pixel region to allow light to efficiently pass through (or reflect from) the pixel region.

Electrowetting displays include an array of pixel regions sandwiched between two support plates, such as a first or bottom support plate and a second or top support plate. For example, a bottom support plate in cooperation with a top support plate may contain pixel regions that include a liquid electrowetting oil, a liquid electrolyte solution, one or more pixel walls between the support plates, and one or more spacers between the support plates. The support plates may be made of a suitable glass, plastic, or other transparent material and may be rigid or flexible, for example. Generally, a material or layer is "transparent" if the material or layer transmits a relatively large fraction of the light incident upon it. For example, a transparent material or layer may transmit more than 70% and, more particularly, more than 80% of the light impinging on its surface, though claimed subject matter is not limited in this respect. The pixel regions include various layers of materials built on or over the bottom support plate. One example layer is an amorphous fluoropolymer (AF) with hydrophobic behavior, around portions of which pixel walls are built in certain embodiments.

Hereinafter, example embodiments include, but are not limited to, reflective electrowetting displays that include a clear or transparent top support plate and a bottom support plate, which need not be transparent, e.g., made of an opaque material. The transparent top support plate may be glass or any suitable transparent material, such as a transparent plastic, quartz, or semiconductor material, for example, and claimed subject matter is not limited in this respect. The terms "top" and "bottom" are generally used to identify the opposing support plates of an electrowetting display device, and do not necessarily refer to a direction referenced to gravity or to a viewing side of the electrowetting display device. Also, for the sake of convenience of describing example embodiments, the top support plate is the surface through which the pixel regions of a (reflective) electrowetting display are viewed.

In certain embodiments, individual reflective electrowetting pixel regions include a reflective layer on or over the bottom support plate, a transparent electrode layer adjacent to the reflective layer, and a hydrophobic layer on the electrode layer. The pixel walls of each pixel and/or each sub-pixel, the hydrophobic layer, and the transparent top support plate at least partially enclose a fluid region or cavity. Within the fluid region, a first fluid, e.g., an electrically non-conductive first liquid, such as an opaque oil, is retained in the individual electrowetting pixels or sub-pixels by the pixel walls. A second fluid, e.g., a second liquid, overlies the first liquid and may overlie some of the pixel walls of the patterned pixel region grid. In certain embodiments, the second liquid is a liquid electrolyte solution that is electrically conductive or polar and may be a water or a salt solution, such as a solution of potassium chloride in water. The second liquid may be transparent, or may be colored or light-absorbing. The second liquid is immiscible with the first liquid. In general, substances are immiscible with one another if the substances do not substantially form a solution, although in a particular embodiment, the second liquid might not be perfectly immiscible with the first liquid. In general, an "opaque" liquid is a liquid that appears black to an observer. For example, an opaque liquid strongly absorbs a broad spectrum of wavelengths (e.g., including those of red, green and blue light) in the visible region of electromagnetic radiation appearing black. However, in certain embodiments, an opaque liquid may absorb a relatively narrower spectrum of wavelengths in the visible region of electromagnetic radiation and may not appear perfectly black.

In some embodiments, the opaque liquid is a nonpolar electrowetting oil. In certain embodiments, the first liquid may absorb at least a portion of the visible light spectrum. The first liquid may be transmissive for a portion of the visible light spectrum, forming a color filter. For this purpose, the first liquid may be colored by addition of pigment particles or a dye. Alternatively, the first liquid may be black, for example by absorbing substantially all portions of the visible light spectrum, or reflecting. A reflective first liquid may reflect the entire visible light spectrum, making the layer appear white, or a portion of the entire visible light spectrum, making the layer have a color. In example embodiments, the first liquid is black and, therefore, absorbs substantially all portions of an optical light spectrum, for example, in the visible light spectrum. The opaque liquid is disposed in the fluid region within individual pixels or sub-pixels. A coverage area of the opaque first liquid on the bottom hydrophobic layer is electrically adjustable to affect the amount of light incident on the reflective electrowetting display that reaches the reflective material at the bottom of or under each pixel or sub-pixel.

One or more spacers and one or more edge seals may also be located between the two support plates to at least partially enclose the fluid region. The spacers and the edge seals mechanically couple the first support plate with the opposing, overlying second support plate, and form a separation between the first support plate and the second support plate, as well as contribute to the mechanical integrity of the electrowetting display device. In example embodiments, the edge seals are disposed along a periphery of an array of electrowetting pixel regions, to facilitate retaining liquids (e.g., the first liquid and the second liquid) between the first support plate and the second support plate. The spacers can be at least partially transparent so as to not hinder throughput of light in the electrowetting display. The transparency of the spacers may at least partially depend on the refractive index of the spacer material, which in certain embodiments is similar to or the same as the refractive indices of surrounding media. The spacers may also be chemically inert to surrounding media.

In some embodiments, an electrowetting display as described herein may form a portion of a system that includes one or more processors and one or more computer memories, which may reside on a control board, for example. Display software may be stored on the one or more memories and may be operable with the one or more processors to modulate light that is received from an outside source (e.g., ambient room light) or out-coupled from a lightguide of the display device. For example, display software may include code executable by a processor to modulate optical properties of individual pixel regions of the electrowetting display based, at least in part, on electronic signals representative of a static image and/or video data. The code may cause the processor to modulate the optical properties of pixel regions by controlling electrical signals (e.g., voltages, currents, and fields) on, over, and/or in layers of the electrowetting display.

In some embodiments, a display device includes a pixel processing pipeline including a spacer compensation stage. The spacer compensation stage may be configured to determine a location of a first sub-pixel region occupied by a spacer in a sub-pixel region map, determine a light energy value assigned to the first sub-pixel region, determine a location of a neighboring sub-pixel region of a same type as the first sub-pixel region in a neighboring sub-pixel region, and increase a light energy value assigned to the neighboring sub-pixel region to a compensated light energy value to compensate for at least a portion of the light energy value assigned to the first sub-pixel region. By this, the spacer compensation stage can generate a compensated sub-pixel region map including the compensated light energy value for the neighboring sub-pixel region. The display device may display the compensated sub-pixel region map on the sub-pixel grid. In some embodiments, the spacer compensation stage determines a location of at least four nearest diagonal neighboring sub-pixel regions and increases a light energy value assigned to each of the nearest diagonal neighboring sub-pixel regions to a plurality of compensated light energy values. Similarly, the spacer compensation stage may also determine a location of at least four nearest orthogonal neighboring sub-pixel regions and increase a light energy value assigned to each of the nearest orthogonal neighboring sub-pixel regions to a second plurality of compensated light energy values. By this, the spacer compensation stage generates the compensated sub-pixel region map including the plurality of compensated light energy values for the four nearest diagonal neighboring sub-pixel regions and/or the second plurality of compensated light energy values for the four nearest orthogonal neighboring sub-pixel regions.

Figure 2:
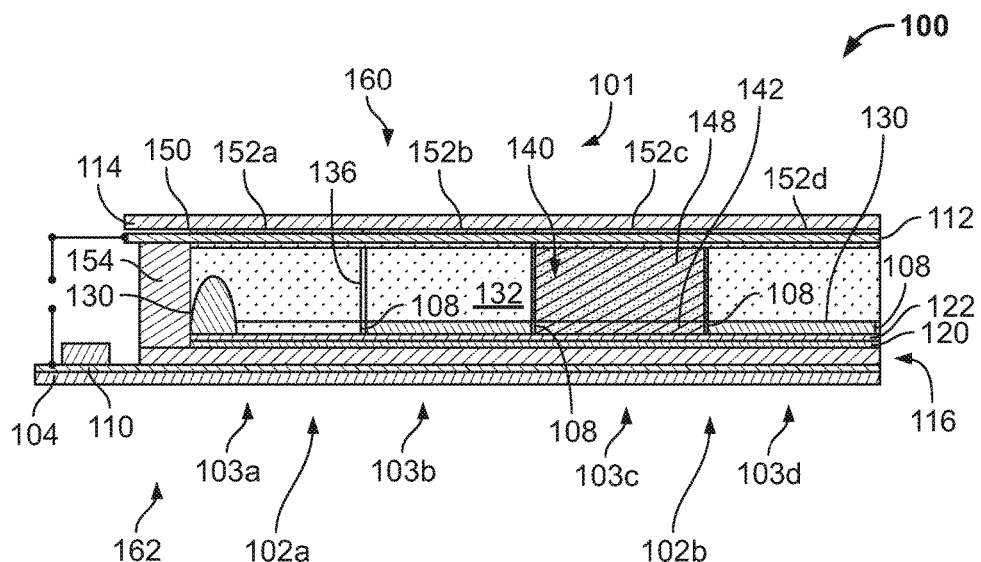
FIG. 2 is a cross-sectional view of the portion of the electrowetting display device of FIG. 1 with a first electrowetting sub-pixel activated to expose a portion of a display area.
Figure 3:
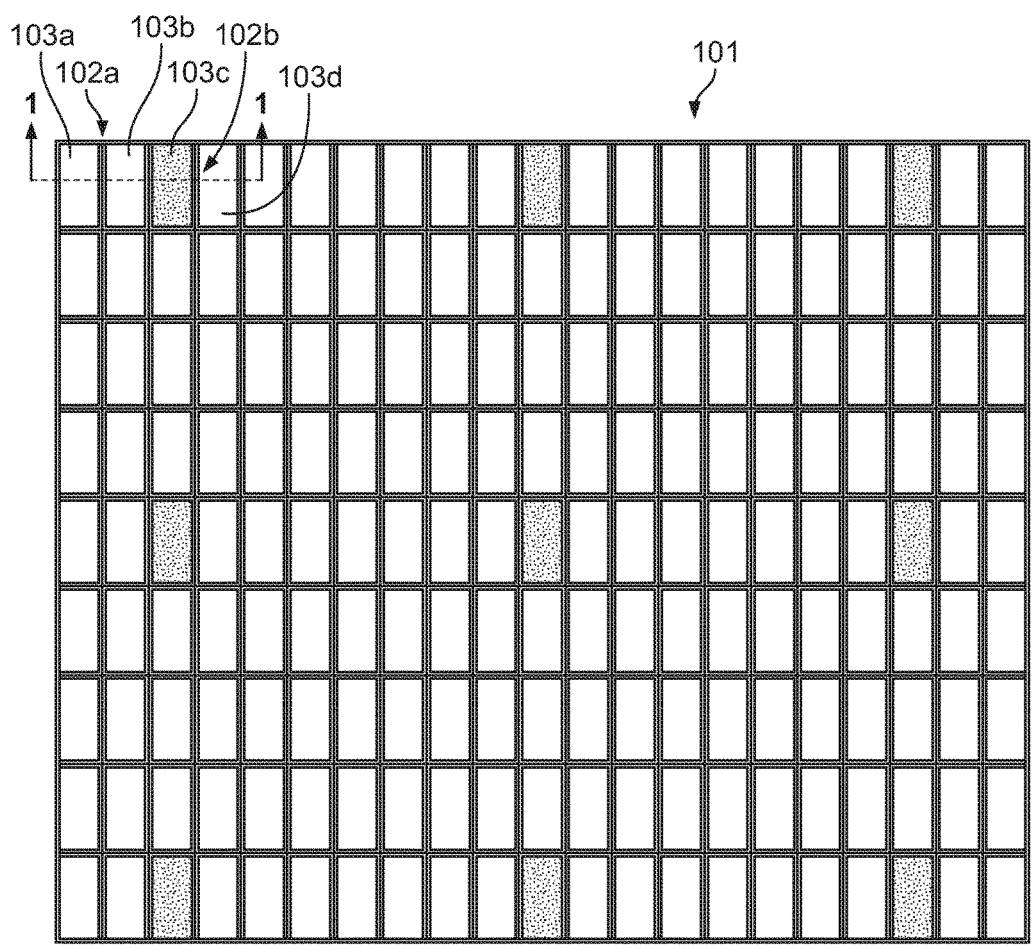
FIG. 3 is a top view of a plurality of electrowetting pixel regions of an example electrowetting display device, with each electrowetting pixel region including two sub-pixels.

Referring now to the figures, FIG. 1 is a cross-sectional view of a portion of an example reflective electrowetting display device 100 including a pixel grid 101 with several electrowetting pixel regions 102, namely electrowetting pixel region 102a and electrowetting pixel region 102b. Each electrowetting pixel region 102a, 102b includes a plurality of sub-pixel regions 103. In the embodiment shown in FIG. 1, each electrowetting pixel region 102a, 102b includes two sub-pixel regions 103. For example, in this embodiment, electrowetting pixel region 102a includes a red sub-pixel region 103a and a green sub-pixel region 103b and electrowetting pixel region 102b includes a blue sub-pixel region 103c and a white sub-pixel region 103d. In example embodiments, blue sub-pixel region 103c of select electrowetting pixel regions 102b is replaced with a sub-pixel region spacer, as described herein. FIG. 2 shows the same cross-sectional view as FIG. 1 in which an electric potential has been applied to red sub-pixel region 103a causing displacement of a first liquid disposed in electrowetting pixel region 102a, as described below. Two complete electrowetting pixel regions 102 are shown in cross-section in FIGS. 1 and 2. FIG. 3 is a top view of an example reflective electrowetting display device 100 including pixel grid 101 having a plurality of electrowetting pixel regions 102 formed over a first or bottom support plate 104 (shown in FIGS. 1 and 2).

As shown in FIG. 1, each sub-pixel region 103 defines a display surface area 106. More specifically, in this embodiment, display surface area 106 is defined by one or more pixel wall portions 108 at least partially forming a perimeter of associated electrowetting pixel region 102 and/or associated sub-pixel region 103, as described below, having a first dimension, such as a width, between opposing lateral pixel wall portions 108, and a second dimension, such as a length, between the remaining opposing pixel wall portions 108. Electrowetting display device 100 may include any number (usually a very large number, such as thousands or millions) of electrowetting pixel regions 102.

Referring further to FIGS. 1 and 2, an electrode layer 110 having a plurality of pixel electrodes is formed on bottom support plate 104. Electrode layer 110 and/or the one or more pixel electrodes are operatively coupled to a second or common electrode 112 positioned under a second or top support plate 114 for creating, in conjunction with common electrode 112, a voltage differential between electrode layer 110 and common electrode 112 to cause displacement of the first liquid, e.g., an oil, within the associated electrowetting pixel region 102 or the associated sub-pixel region 103. These example embodiments are not limiting with respect to the location of the first electrode and the second electrode, and claimed subject matter is not limited in this respect. In particular embodiments, one or more additional layers may be positioned between electrode layer 110 and bottom support plate 104, in which TFTs, gates, and/or source lines are located, for example. In these embodiments, electrode layer 110 may not be formed directly on bottom support plate 104. In various embodiments, electrode layer 110 may be connected to any number of transistors, such as suitable thin film transistors (TFTs) (not shown), that are switched to either select or deselect corresponding electrowetting pixel regions 102 or sub-pixel regions 103 using active matrix addressing, for example. A TFT is a particular type of field-effect transistor that includes thin films of an active semiconductor layer as well as a dielectric layer and metallic contacts over a supporting (but non-conducting) substrate, which may be glass or any suitable transparent or non-transparent material, for example.

A reflective layer 116 is positioned adjacent, e.g., on electrode layer 110, as shown in FIGS. 1 and 2, for example. In particular embodiments, one or more additional layers may be positioned between reflective layer 116 and electrode layer 110. In these embodiments, reflective layer 116 may not be formed directly on electrode layer 110. In an alternative embodiment, reflective layer 116 is positioned under a transparent electrode layer. In this alternative embodiment, reflective layer 116 is positioned between the transparent electrode layer 110 and bottom support plate 104. Reflective layer 116 may reflect light within the entire visible spectrum, making the layer appear relatively bright, or reflect a portion of light within the visible spectrum, making the layer have a color. In this embodiment, reflective layer 116 is positioned within the pixel region, e.g., within each electrowetting pixel region 102, to provide specular reflection.

In example embodiments, reflective layer 116 is positioned on electrode layer 110 within electrowetting pixel region 102. In certain embodiments, reflective layer 116 is formed or made of any suitable materials including, for example, a metal (90%, 95% or greater than 95% metal), an alloy, a doped metal, or a dielectric reflector material. Suitable metal materials for reflective layer 116 include, without limitation, aluminum, silver, gold, copper, nickel, platinum, rhodium, lanthanum, and/or silicon nickel. Suitable alloy materials for reflective layer 116 include, without limitation, aluminum with copper or aluminum with nickel. In further alternative embodiments, reflective layer 116 is made of any suitable material providing a desired specular reflectance. In alternative embodiments, reflective layer includes a suitable diffuse reflective material deposited on or over electrode layer 110. In this alternative embodiment, any suitable diffuse reflective material, such as titanium dioxide ($TiO_2$), providing a desired diffuse reflectance may be used.

Electrowetting pixel regions 102 may have specific and/or additional structural features. Additionally or alternatively, reflective layer 116 may have structural features, for example, one or more relatively thinner areas and/or one or more relatively thicker areas within reflective layer 116 to control movement of the fluids. Alternatively, reflective layer 116 may be deposited on a structural feature conforming to a shape of the structural feature.

A suitable dielectric barrier layer 120 may at least partially separate electrode layer 110 from a hydrophobic layer 122, such as an amorphous fluoropolymer layer forming a surface of electrowetting pixel region 102 or sub-pixel region 103 in certain embodiments. For example, dielectric barrier layer 120 may be deposited on reflective layer 116. Dielectric barrier layer 120 may be formed from various materials including one or more organic material layers or a combination of organic and inorganic material layers. A thickness of the insulating dielectric barrier layer 120 may be less than 2 micrometers and may be less than 1 micrometer; for example, the insulating dielectric barrier layer 120 may be 100 nanometers to 800 nanometers in thickness in certain embodiments. In some embodiments, hydrophobic layer 122 is an amorphous fluoropolymer layer including any suitable fluoropolymer(s), such as AF1600® fluoropolymer, produced by DuPont, based in Wilmington, Del. Hydrophobic layer 122 is transparent in the example embodiment. As described above, in certain embodiments, reflector layer 116 acts both as a pixel electrode and a reflector layer.

In the example embodiment, one or more pixel wall portions 108 form patterned electrowetting pixel grid 101 on hydrophobic layer 122. Pixel wall portions 108 may include a photoresist material such as, for example, an epoxy-based negative photoresist material SU-8. Patterned electrowetting pixel grid 101 includes a plurality of rows and a plurality of columns of pixel wall portions that form an array of electrowetting pixel regions 102 and/or sub-pixel regions 103, such as shown in FIG. 3, including a plurality of electrowetting pixels 102 or sub-pixels that may have a width and a length in a range of about 50 to 500 micrometers, for example. In the example embodiment shown in FIG. 3, each sub-pixel region 103 has a width of 60 micrometers and a height of 120 micrometers such that an electrowetting pixel region 102 including two sub-pixel regions 103 has a square cross-sectional area with an overall width of 120 micrometers and an overall height of 120 micrometers.

A first liquid 130, which may have a thickness (e.g., a height as shown in FIGS. 1 and 2 for example) in a range of about 1 micrometer to 10 micrometers, for example, overlays hydrophobic layer 122. First liquid 130 is partitioned by pixel wall portions 108 of patterned electrowetting pixel grid 101. A second liquid 132, such as an electrolyte solution, overlays first liquid 130 and, in certain embodiments, at least a portion of pixel wall portions 108 of patterned electrowetting pixel grid 101. In certain embodiments, as described above, second liquid 132 may be electrically conductive and/or polar. For example, second liquid 132 may be water or a water solution, or a salt solution such as a solution of potassium chloride in water or a mixture of water and ethyl alcohol. In certain embodiments, second liquid 132 is transparent, but may be colored or absorbing. First liquid 130 is electrically non-conductive and may, for example, be an alkane-like hexadecane or (silicone) oil. As described above, second liquid 132 is immiscible with first liquid 130.

As described above, hydrophobic layer 122 is arranged on or over bottom support plate 104 to create an electrowetting surface area. The hydrophobic character of hydrophobic layer 122 causes first liquid 130 to adjoin preferentially to hydrophobic layer 122 because first liquid 130 has a higher wettability with respect to a top surface of hydrophobic layer 122 than second liquid 132 in the absence of a voltage. Wettability relates to the relative affinity of a fluid, e.g., a liquid, for the surface of a solid. Wettability increases with increasing affinity, and it may be measured by the contact angle formed between the fluid and the solid and measured internal to the fluid of interest. For example, such a contact angle may increase from relative non-wettability for a contact angle of more than 90° to complete wettability for a contact angle of 0°, in which case the liquid tends to form a film on the surface of the solid.

Top support plate 114 covers second liquid 132 and one or more spacers 136 to maintain second liquid 132 over electrowetting pixel grid 101. In one embodiment, spacers 136 are positioned between top support plate 114 and pixel wall portion 108. In example embodiments, spacer 136 is coupled to and extends from top support plate 114 to contact a contact surface on a first or distal end of one or more corresponding pixel wall portions 108, as described in greater detail below. In certain embodiments, one or more components or layers may be positioned between top support plate 114 and spacers 136. In this arrangement, a contact surface of spacer 136 contacts a contact surface of corresponding pixel wall portion 108 to provide a stable contact joint at an interface between pixel wall portion 108 and spacer 136, providing mechanical strength at the interface that is less sensitive to overflow and/or leakage of first liquid 130 and/or second liquid 132 contained within the pixel regions. In alternative embodiments, spacer 136 does not rest on pixel wall portion 108 but is substantially aligned with pixel wall portion 108. This arrangement may allow spacer 136 to come into contact with pixel wall portion 108 upon a sufficient pressure or force being applied to top support plate 114. Multiple spacers 136 may be interspersed throughout electrowetting pixel grid 101.

In the example embodiment shown in FIGS. 1-3, additional spacers, referred to herein as sub-pixel region spacers 140, are positioned in a pre-determined pattern, for example as shown in FIGS. 4-8, throughout the electrowetting display, as described in greater detail below. Referring further to FIGS. 1 and 2, a plurality of pixel regions 102 are formed between first support plate 104 and second support plate 114. Each pixel region 102 includes one or more sub-pixel regions 103 having a plurality of pixel wall portions 108 forming a perimeter of pixel region 102 and/or sub-pixel regions 103. Each sub-pixel region spacer 140 is positioned within a corresponding sub-pixel region 103 and extends between top support plate 114 and bottom support plate 104. More specifically, as described above, a plurality of pixel wall portions 108 formed on or over first support plate 104 at least partially form a perimeter of an electrowetting pixel region 102 or a sub-pixel region 103, e.g., a perimeter of sub-pixel region 103c shown in FIGS. 1 and 2. A first spacer portion 142 is formed or positioned in a first portion of sub-pixel region 103c. First spacer portion 142 is disposed within the plurality of pixel wall portions in sub-pixel region 103c. First spacer portion 142 adjoins the plurality of pixel wall portions such that a landing surface 144 of first spacer portion 142 extends between the plurality of pixel walls. In example embodiments, each of the plurality of pixel wall portions forming the perimeter of sub-pixel region 103c has a contact surface, and first landing surface 144 is substantially coplanar with the contact surface of each pixel wall portions. In the example embodiment, first spacer portion 142 has a height between a first end contacting a surface of the electrowetting pixel region 102 and/or sub-pixel region 103, e.g., a top surface of hydrophobic layer 122 forming the surface of sub-pixel region 103c, and an opposing second end having a landing surface 144 substantially equal to a height of each pixel wall portion 108 forming the perimeter of sub-pixel region 103c between a first end contacting the bottom surface of sub-pixel region 103c and an opposing second end. First landing surface 144 is positioned at a height above the surface of hydrophobic layer 122 substantially equal to a height of each pixel wall portion between a first end contacting the surface of hydrophobic layer 122 and an opposing second end of each pixel wall portion. Further, in example embodiments, first spacer portion 142 of sub-pixel region spacer 140 is formed or made of the same material as pixel wall portions 108, e.g., a photoresist material such as an epoxy-based negative photoresist material SU-8, although other suitable photoresist materials may be used in alternative embodiments.

In this example embodiment, the electrowetting pixel region 102 or sub-pixel region 103, e.g., sub-pixel region 103c, has a rectangular cross-sectional area. First spacer portion 142 includes a plurality of walls 146. Each wall 146 contacts a corresponding pixel wall portion 108 forming the perimeter of sub-pixel region 103c to completely fill sub-pixel region 103c such that first liquid 130 is not able to reside in sub-pixel region 103c. As a result, sub-pixel region 103c is sacrificed, i.e., no light will be reflected or emitted from sub-pixel region 103c. In a particular embodiment, each wall 146 has a width and a height substantially identical to a respective width and a respective height of corresponding pixel wall portion 108.

Sub-pixel region spacer 140 also includes a second spacer portion 148 coupled to second support plate 114. In this embodiment, one or more layers may be positioned between second spacer portion 148 and second support plate 114. Second spacer portion 148 is coupled to first spacer portion 142 to form sub-pixel region spacer 140 between first support plate 104 and second support plate 114. More specifically, second spacer portion 148 extends from second support plate 114 within the associated pixel region such that a landing surface 150 of second spacer portion 148 contacts landing surface 144 of corresponding first spacer portion 142. As described herein, landing surface 144 of first spacer portion 142 is shaped and positioned to align with landing surface 150 of second spacer portion 148 to form sub-pixel region spacer 140. The contact between first spacer portion 142 and second spacer portion 148 provides a stable contact joint at an interface between first spacer portion 142 and second spacer portion 148. The stable contact joint provides for improved mechanical strength at the interface and, overall, throughout the electrowetting display. In example embodiments, a shape and dimensions of landing surface 150 are substantially similar to a corresponding shape and corresponding dimensions of landing surface 144.

In the example embodiments, additional spacers 136 extend from second support plate 114 to contact pixel wall portions 108. For example, as shown in FIGS. 1 and 2, spacer 136 is formed on or over second support plate 114 and extends from second support plate 114 to couple to a corresponding pixel wall portion 108 partially forming a perimeter of a second electrowetting pixel region 102 or sub-pixel region 103, e.g., pixel wall portion 108 between sub-pixel region 103a and sub-pixel region 103b partially forming a perimeter of sub-pixel region 103a and sub-pixel region 103b. In example embodiments, second spacer portion 148 of sub-pixel region spacer 140 has a height substantially equal to a height of spacer 136 and is formed of the same material as first spacer portion 142 and/or spacer 136, e.g., a photoresist material such as an epoxy-based negative photoresist material SU-8, although other suitable photoresist materials may be used in alternative embodiments.

FIGS. 4-8 are top views of an electrowetting display including a plurality of electrowetting pixel regions forming a pattern of RGBW sub-pixel regions and a plurality of sub-pixel region spacers replacing a respective blue sub-pixel region in selected electrowetting pixel regions in the patterned electrowetting display, according to example embodiments. Referring further to FIGS. 4-8, in example embodiments, a plurality of pixel wall portions 108 are formed on or over bottom support plate 104 and associated with a plurality of electrowetting pixel regions 102. For example, a plurality of pixel wall portions 108 form a perimeter of electrowetting pixel region 102a and associated red sub-pixel region 103a and green sub-pixel region 103b. Similarly, a plurality of pixel wall portions 108 form a perimeter of electrowetting pixel region 102b and associated blue sub-pixel region 103c and white sub-pixel region 103d. As shown in FIGS. 4-8, one or more blue sub-pixel regions 103c are replaced with sub-pixel region spacer 140 including first spacer portion 142 formed or positioned in a first portion of electrowetting pixel region 102b, i.e., within a first portion of sub-pixel region 103c, and second spacer portion 148 positioned within the associated sub-pixel region and coupled between first spacer portion 142 and top support plate 114. Second spacer portion 148 on top support plate 114 is coupled to first spacer portion 142 to form sub-pixel region spacer 140 between bottom support plate 104 and top support plate 114. In example embodiments, first spacer portion 142 is positioned within sub-pixel region 103c and extends between pixel wall portions 108 to completely fill sub-pixel region 103c. In this embodiment, pixel region 102b includes a second sub-pixel region, i.e., sub-pixel region 103d. First liquid 130 and second liquid 132 are disposed within the second sub-pixel region. In this embodiment, the second sub-pixel region includes a white sub-pixel region; however, in alternative embodiments, the second sub-pixel region may be a red sub-pixel region or a green sub-pixel region.

In example embodiments, a second pixel region is positioned at a distance from the first pixel region. The first pixel region and the second pixel region each includes two sub-pixel regions. In the embodiments shown in FIGS. 4-8, the second pixel region is positioned with respect to the first pixel region at a pitch of at least 2. In a particular embodiment, each of the first pixel region and the second pixel region includes a first sub-pixel region including sub-pixel region spacer 140, e.g., replacing a blue sub-pixel region, and a second sub-pixel region comprising a white sub-pixel region. A third pixel region is adjacent the first pixel region. The first pixel region and the third pixel region are arranged in a row of pixel regions, and the third pixel region comprises a red sub-pixel region and a green sub-pixel region.

Figure 4:
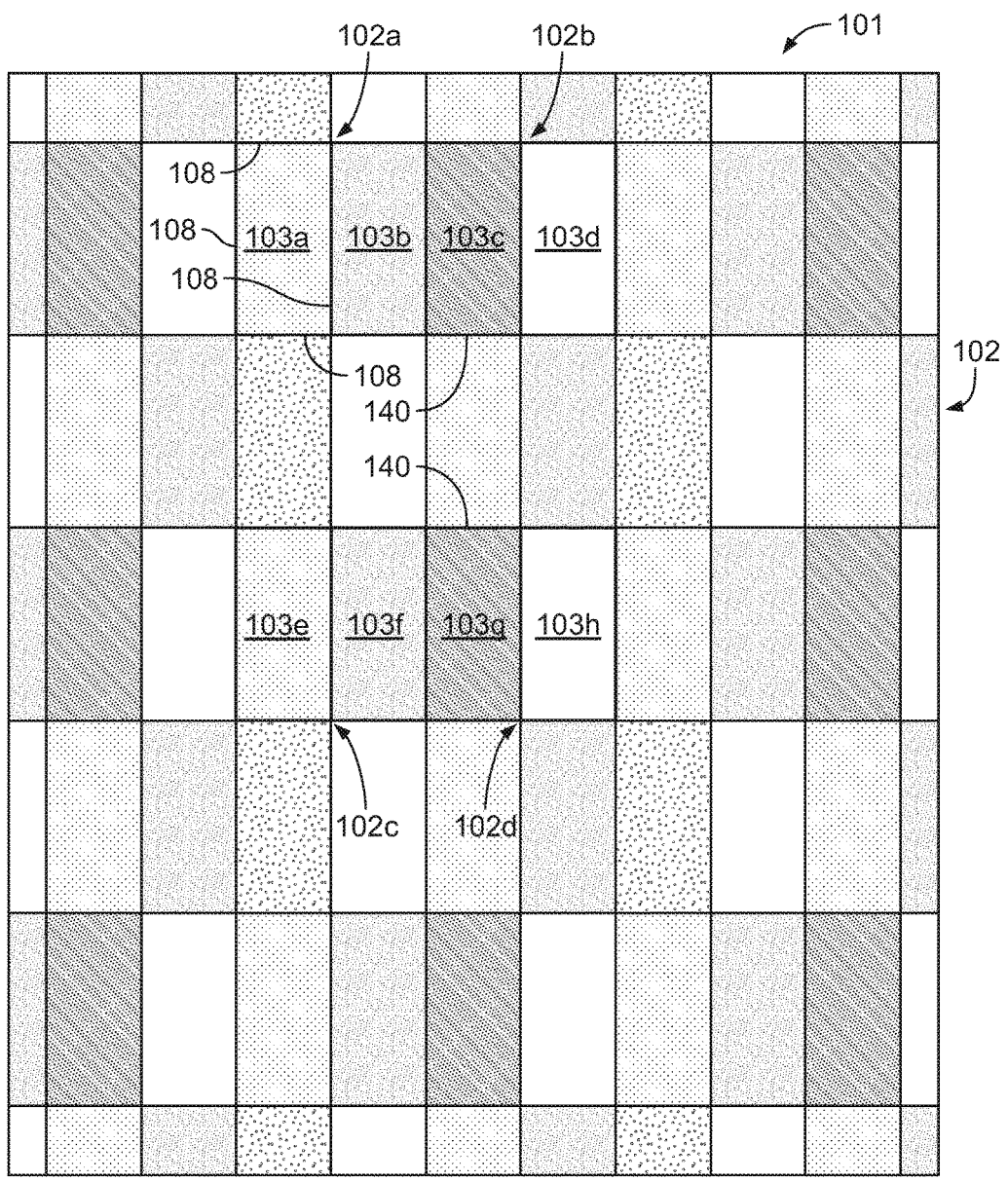
FIG. 4 is a top view of an electrowetting display including a plurality of electrowetting pixel regions forming a pattern of RGBW sub-pixels and a plurality of spacers replacing a respective blue sub-pixel in selected electrowetting pixel regions in the patterned electrowetting display, according to an example embodiment.
Figure 5:
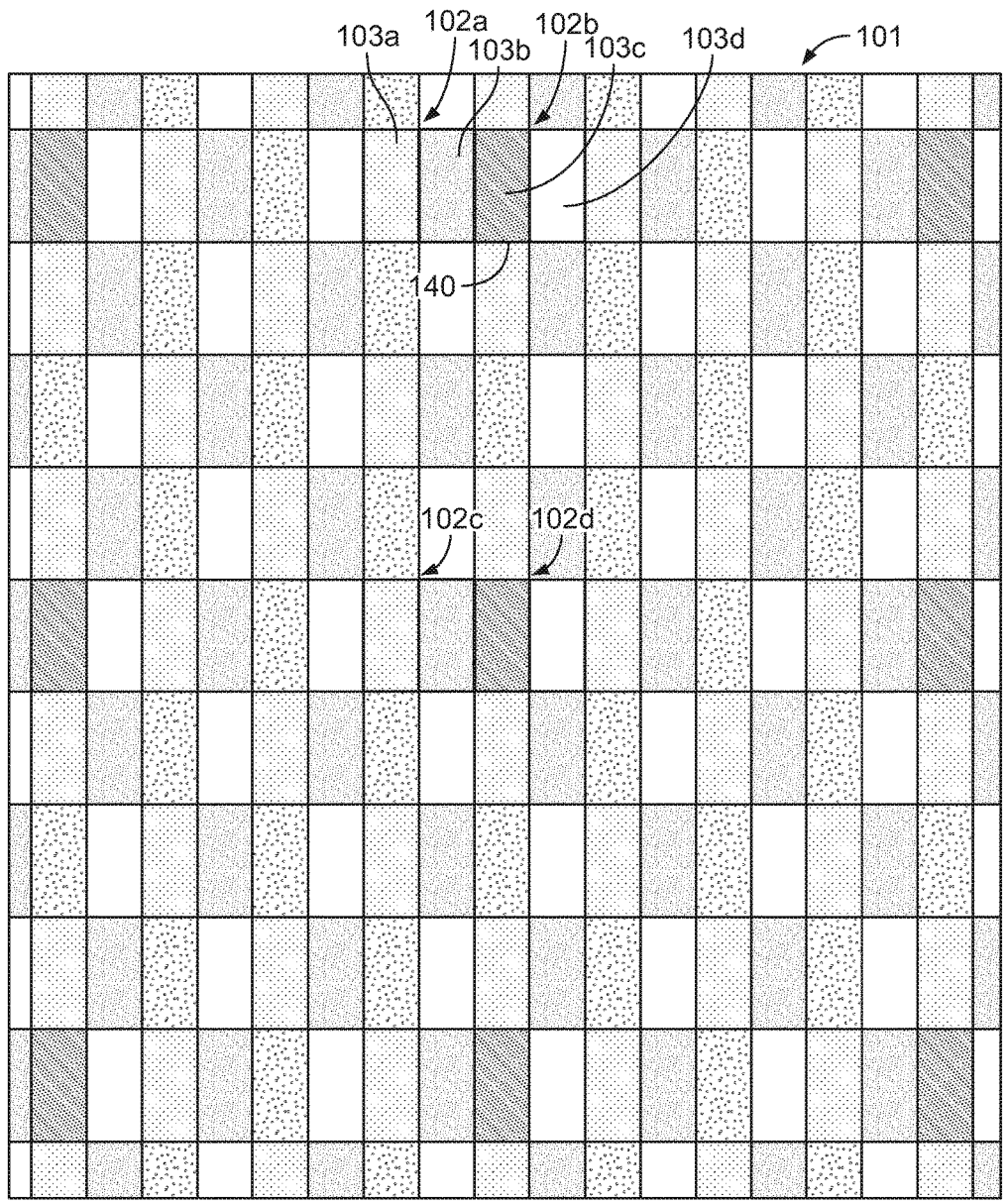
FIG. 5 is another top view of an electrowetting display illustrating a variation of the pattern shown in FIG. 4, according to another example embodiment.
Figure 6:
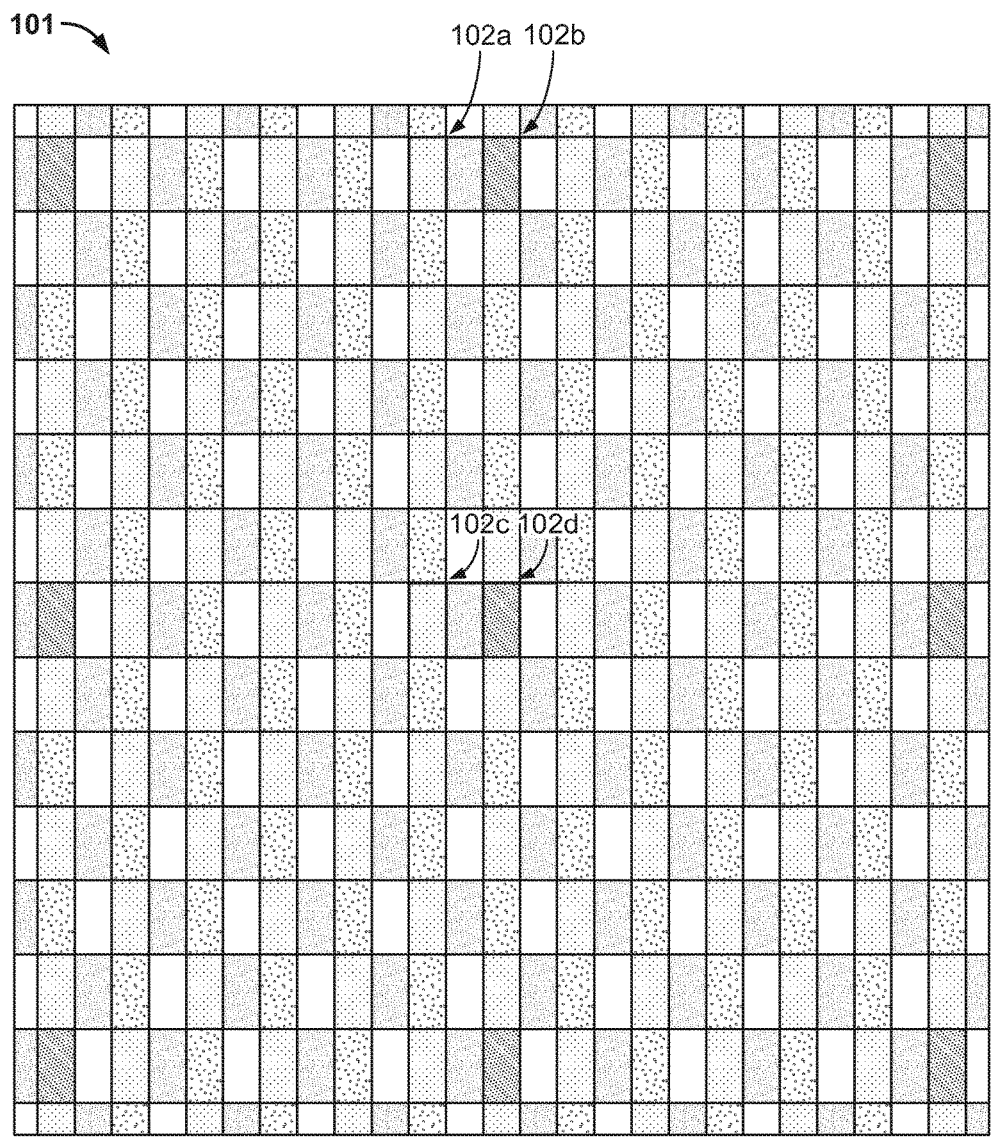
FIG. 6 is another top view of an electrowetting display illustrating a variation of the pattern shown in FIG. 4, according to another example embodiment.
Figure 7:
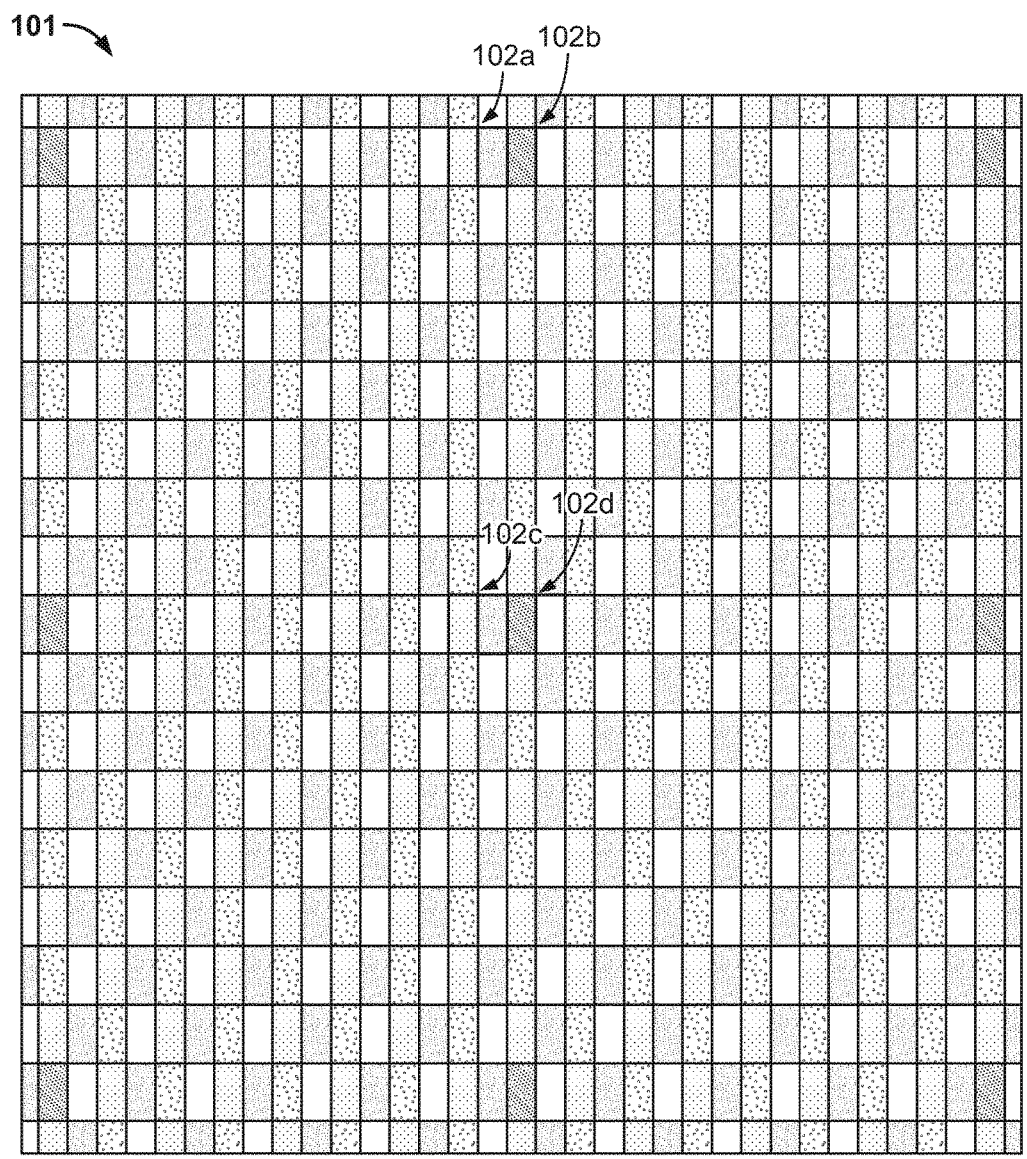
FIG. 7 is another top view of an electrowetting display illustrating a variation of the pattern shown in FIG. 4, according to another example embodiment.
Figure 8:
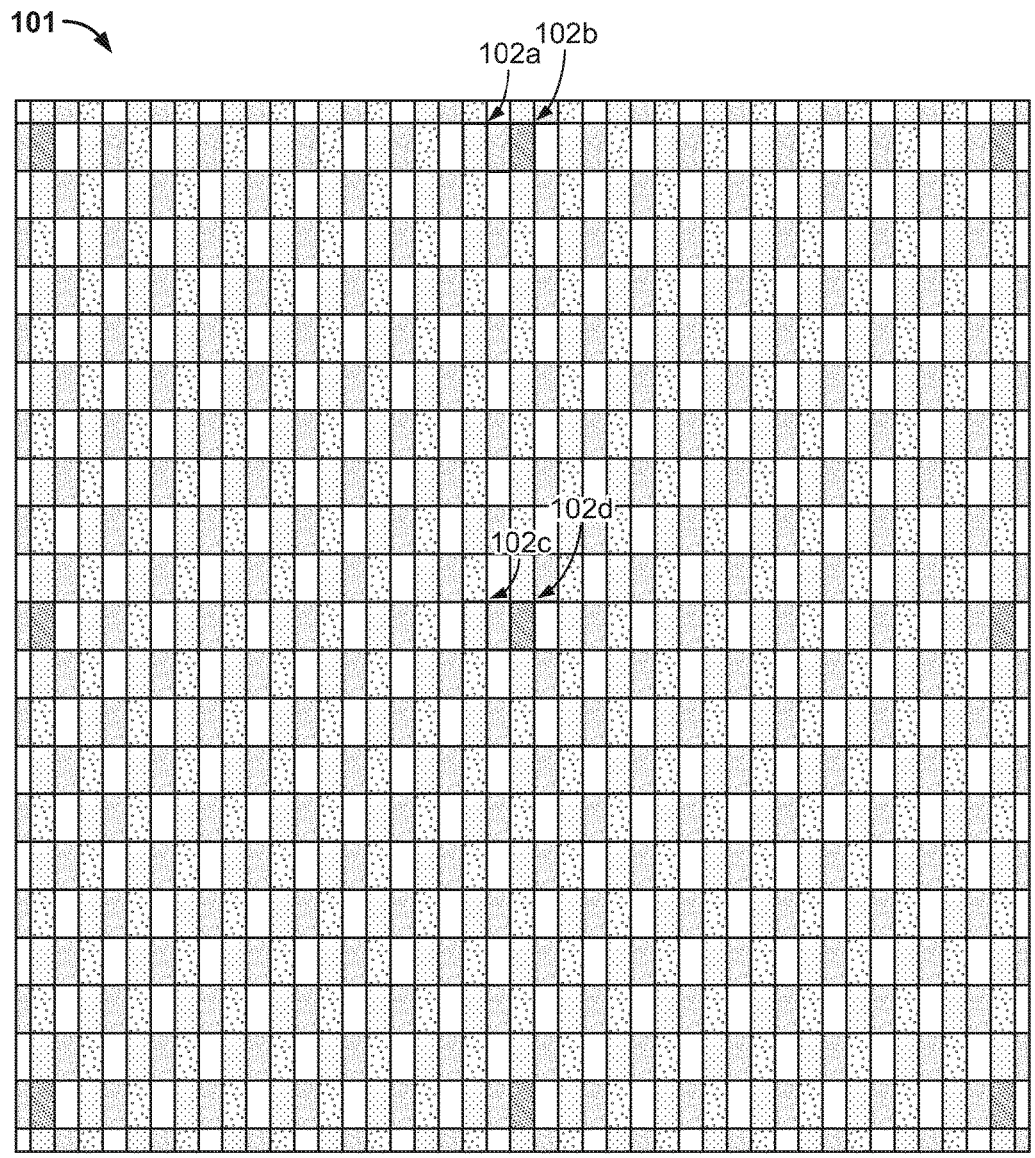
FIG. 8 is another top view of an electrowetting display illustrating a variation of the pattern shown in FIG. 4, according to another example embodiment.

Referring further to FIG. 4, for example, a second pixel region is positioned at a distance from the first pixel region. The second pixel region includes a plurality of pixel wall portions forming a perimeter of the second pixel region. A second spacer is positioned within the second pixel region. The second spacer has a first spacer portion formed or positioned in a first portion of the second pixel region. A second spacer portion extends from the second support plate within the second pixel region and is coupled to the first spacer portion. More specifically, in example embodiments, a plurality of pixel wall portions 108 form a perimeter of electrowetting pixel region 102c and associated red sub-pixel region 103e and green sub-pixel region 103f. Similarly, a plurality of pixel wall portions 108 form a perimeter of electrowetting pixel region 102d and associated blue sub-pixel region 103g and white sub-pixel region 103h. As shown in FIG. 4, a row of pixel regions 102 is positioned between a row of pixel regions including pixel regions 102a and 102b and a row of pixel regions including pixel regions 102c and 102d. The sub-pixel region spacer configuration of FIG. 4 has a spacer pitch of 2. In certain embodiments, the spacer pitch is at least 2, and, more particularly, the spacer pitch is at least 6, as shown in FIG. 6, and, even more particularly, the spacer pitch is equal 10, as shown in FIG. 8 to provide a suitable number of sub-pixel region spacers 140 while minimally negatively affecting the image quality of electrowetting display device 100. FIG. 5 shows a sub-pixel region spacer configuration having a spacer pitch of 4 and FIG. 7 shows a sub-pixel region spacer configuration having a spacer pitch of 8.

Sub-pixel region spacers 140 in FIGS. 4-8 are all illustrated in a rectangular pattern (e.g., sub-pixel region spacers being placed on the same vertical and horizontal rows of sub-pixel regions). However, in various embodiments, the placement and arrangement of the sub-pixel region spacers on the display can be varied. In one example, sub-pixel region spacers 140 are placed in the display in a diamond configuration. The diamond configuration serves to rotate the rectangular configuration (shown in FIGS. 4-8) and increase the horizontal and vertical pitches of the sub-pixel region spacers, which can make the sub-pixel region spacer pattern less visible. In another embodiment, the horizontal and vertical pitch of the sub-pixel region spacers can be varied in a hexagonal configuration (e.g., such that the sub-pixel region spacers appear as the corners/intersections of a collection of hexagons arranged in a beehive manner) or in a triangular configuration. A hexagon configuration or triangular configuration may provide advantages in that distances between sub-pixel region spacers can be made more uniform to better handle mechanical load while reducing the visible pattern of the sub-pixel region spacers. A combination of the above configurations may be achieved to further mask sub-pixel region spacer patterns within the display. Other variations are possible.

Referring again to FIG. 4, blue sub-pixel region 103g is replaced with sub-pixel region spacer 140 including first spacer portion 142 formed or positioned in a first portion of sub-pixel region 103g. Second spacer portion 148 is positioned within a second portion of sub-pixel region 103g and coupled between first spacer portion 142 and top support plate 114. First spacer portion 142 is positioned within the first portion of sub-pixel region 103g and extends between pixel wall portions 108 to completely fill sub-pixel region 103g. In this embodiment, pixel region 102d includes a second sub-pixel region, i.e., sub-pixel region 103h. First liquid 130 and second liquid 132 are disposed within second sub-pixel region 103h. In this embodiment, the second sub-pixel region includes a white sub-pixel region; however, in alternative embodiments, the second sub-pixel region may be a red sub-pixel region or a green sub-pixel region.

In certain embodiments, one or more filter layers 150 including, for example, a red color filter 152a, a green color filter 152b, a blue color filter 152c, and a transparent color filter 152d as shown in FIGS. 1 and 2, may be positioned between second electrode 112 and top support plate 114. A seal 154 extends about a perimeter of electrowetting display device 100 to contain first liquid 130 and second liquid 132 within the fluid region of the cavity. A voltage applied across, among other things, second liquid 132 and electrode layer 110 of individual electrowetting pixel regions 102 or electrowetting sub-pixel regions 103 controls transmittance or reflectance of the individual electrowetting pixel regions 102 or electrowetting sub-pixel regions 103.

Reflective electrowetting display device 100 has a viewing side 160 corresponding to top support plate 114 through which an image formed by reflective electrowetting display device 100 may be viewed, and an opposing rear side 162 corresponding to bottom support plate 104 as shown, for example, in FIGS. 1 and 2. Reflective electrowetting display device 100 may be a segmented display type in which the image is built of segments. The segments may be switched simultaneously or separately. Each segment includes one electrowetting pixel region 102 or a number of electrowetting pixel regions 102 that may be neighboring or distant from one another. Electrowetting pixel regions 102 included in one segment are switched simultaneously, for example. Electrowetting display device 100 may also be an active matrix driven display type or a passive matrix driven display, for example.

Figure 9:
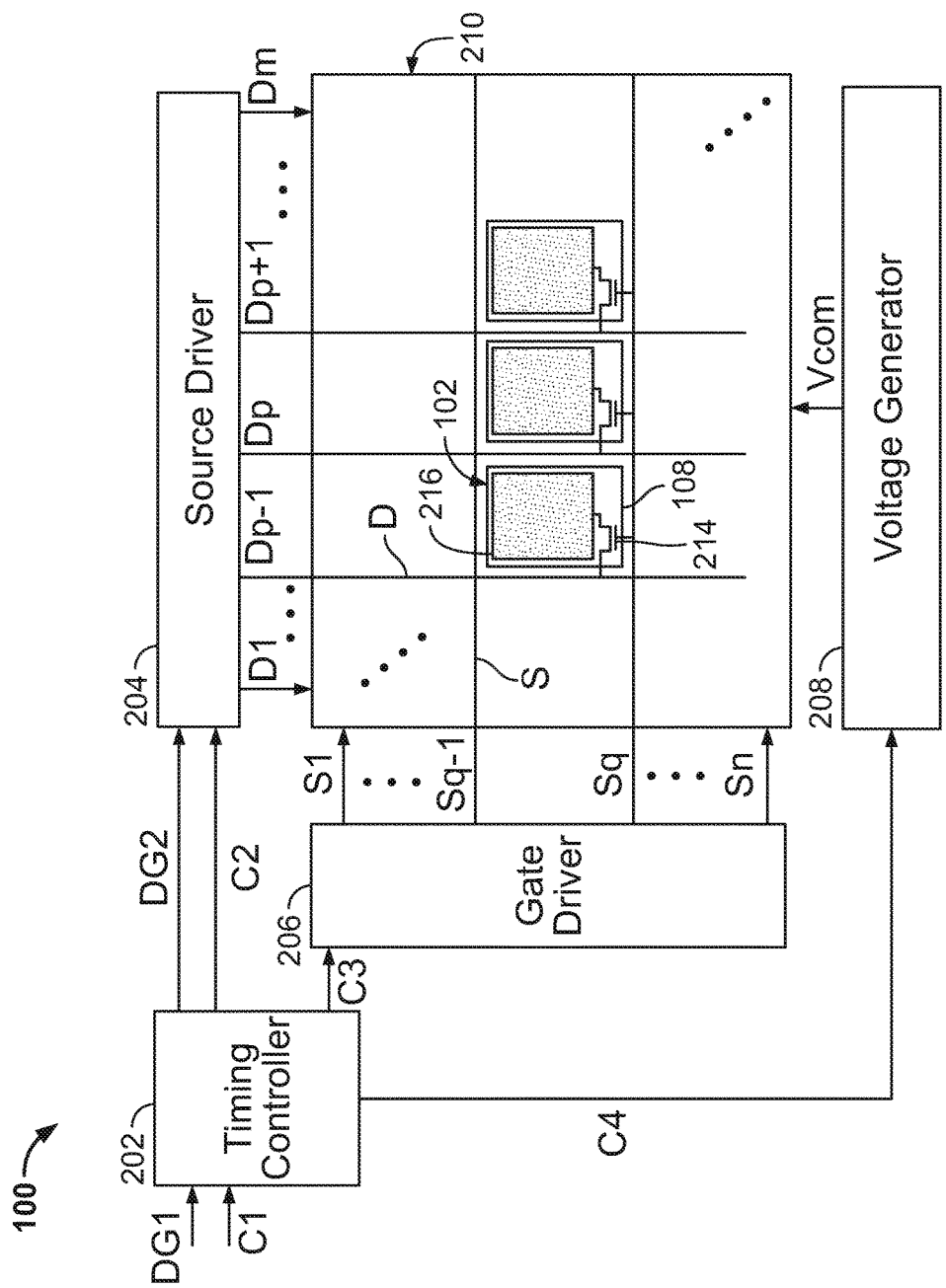
FIG. 9 is a schematic view of an electrowetting display device, according to an example embodiment.

Referring to FIG. 9, electrowetting display device 100 is schematically illustrated that includes a timing controller 202, a source driver (data driver) 204, a gate driver (scan driver) 206, a voltage generator 208, and an electrowetting display panel 210. Electrowetting display panel 210 is driven by timing controller 202, source driver 204, gate driver 206, and voltage generator 208.

As an example of general operation of electrowetting display device 100, responsive to a first data signal DG1 and a first control signal C1 from an external source, e.g., a graphic controller (not illustrated), timing controller 202 applies a second data signal DG2 and a second control signal C2 to source driver 204; a third control signal C3 to gate driver 206; and a fourth control signal C4 to voltage generator 208.

Source driver 204 converts second data signal DG2 to voltages, i.e., data signals, and applies data signals D1, . . . , Dp−1, Dp, Dp+1, . . . , Dm to electrowetting display panel 210. Gate driver 206 sequentially applies scan signals S1, . . . , Sq−1, Sq, . . . , Sn to electrowetting display panel 210 in response to third control signal C3. Voltage generator 208 applies a common voltage Vcom to electrowetting display panel 210 in response to fourth control signal C4. Although not illustrated in FIG. 9, voltage generator 208 generates various voltages required by timing controller 202, source driver 204, and gate driver 206. Electrowetting display panel 210 includes m data lines D, i.e., source lines, to transmit data voltages and n gate lines S, i.e., scan lines, to transmit a gate-on signal.

Electrowetting pixel regions 102 are positioned adjacent to crossing points of data lines D and gate lines S crossing data lines D and thus are arranged in a grid of rows and columns. Each electrowetting pixel region 102 includes a hydrophobic surface (not illustrated in FIG. 9), and a thin film transistor 214 and a pixel electrode 216 under the hydrophobic surface. Each electrowetting pixel region 102 may also include a storage capacitor (not illustrated) under the hydrophobic surface.

A voltage V applied across second fluid 132 and the dielectric barrier layer stack (e.g., hydrophobic layer 122) of individual electrowetting pixel regions 102 can control transmittance or reflectance of individual electrowetting pixel regions 102. When voltage V applied between first signal line 150 and second signal line 152 is set at a non-zero active signal level, electrowetting pixel region 102 will enter into an active state. Electrostatic forces will move second fluid 132 toward electrode layer 110, thereby repelling first fluid 130 from an area of hydrophobic layer 122 to pixel wall portions 108 surrounding the area of hydrophobic layer 122, to a droplet-like shape. This action uncovers first fluid 130 from the surface of hydrophobic layer 122 of electrowetting pixel region 102. When voltage across electrowetting pixel region 102 is returned to an inactive signal level of zero volts or a value near to zero volts, electrowetting pixel region 102 will return to an inactive state, where first fluid 130 flows back to cover hydrophobic layer 122. In this way, first fluid 130 forms an electrically controllable optical switch in each electrowetting pixel region 102.

Generally, thin film transistor 214 includes a gate electrode that is electrically connected to a corresponding scan line of scan lines S, a source electrode that is electrically connected to a corresponding data line of data lines D, and a drain electrode that is electrically coupled to pixel electrode 216. Thus, electrowetting pixel regions 102 are operated, i.e., driving of electrowetting display device 100, based upon scan lines S and data lines D of FIG. 9.

In various embodiments, to reduce the visibility of sub-pixel region spacers 140, the image data may be processed to compensate for the missing light energy at the sub-pixel region spacer 140 location. For example, if sub-pixel region spacer 140 occupies a blue sub-pixel region, the image data may be processed to compensate for the missing blue energy at the sub-pixel region spacer 140 location. In various embodiments, light output from surrounding sub-pixel regions of the same color as the sub-pixel region occupied by sub-pixel region spacer 140 (e.g., blue) can be increased such that a localized reduction in energy of that color at the location of sub-pixel region spacer 140 may not be perceived.

Figure 10:
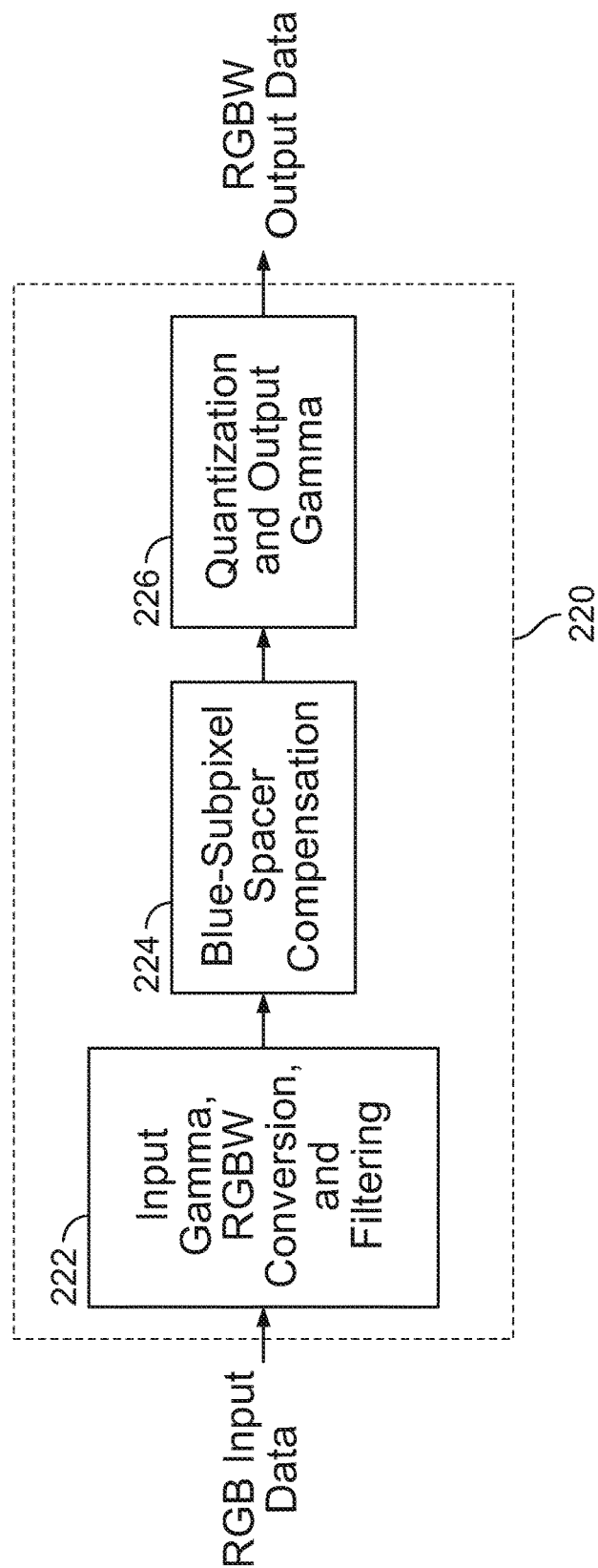
FIG. 10 is a block diagram of a pixel processing pipeline, according to an example embodiment.

FIG. 10 illustrates a functional diagram of a sub-pixel processing pipeline 220 in accordance with various embodiments. In one example, sub-pixel processing pipeline 220 is part of timing controller 202. In another embodiment, sub-pixel processing pipeline 220 is executed within processor 402 (see FIG. 14). Sub-pixel processing pipeline 220 includes a first conversion stage 222, a spacer compensation stage 224, and a quantization and output gamma stage 226. In various approaches, sub-pixel processing pipeline 220 maps image data to a sub-pixel map corresponding to pixel grid 101. In one embodiment, in operation, sub-pixel processing pipeline 220 receives data in the format of RGB input data. After processing, sub-pixel processing pipeline 220 may output data in the format of RGBW output data.

In various embodiments, first conversion stage 222 will receive the RGB input data and convert the RGB input data to the linear domain by applying a 2.2 gamma function. First conversion stage 222 will subsequently convert the data to the RGBW domain. In some embodiments, first conversion stage 222 will also digitally filter the RGBW domain data to enhance the image and to map the image data to the target RGBW sub-pixel pattern of the display. Spacer compensation stage 224 can receive the mapped RGBW sub-pixel image data from first conversion stage 222 in the form of a sub-pixel map and can perform additional filtering to redistribute the energy found at the sub-pixel region spacer locations to neighboring sub-pixel regions of the same color or type. In one example, spacer compensation stage 224 can redistribute the image found at blue sub-pixel region spacer locations to neighboring blue sub-pixel regions. Lastly, quantization and output gamma stage 226 can receive the spacer-compensated RGBW data from spacer compensation stage 224 and can quantize the RGBW data according to the bit depth of the display. Further, quantization and output gamma stage 226 can apply an inverse gamma function to map the data back to the non-linear domain. RGBW output data is subsequently output from sub-pixel processing pipeline 220 and is suitable for consumption by the display.

In one embodiment, spacer compensation stage 224 determines a location of one or more sub-pixel regions in the sub-pixel map that are occupied by a spacer and determines a light energy value (e.g., between 0 and 255) assigned to the spacer-occupied sub-pixel regions in the original sub-pixel map. Spacer compensation stage 224 then determines a location of one or more neighboring sub-pixel regions of the same color or type (e.g., a neighboring blue sub-pixel region) in neighboring pixel regions to the spacer-occupied sub-pixel region. Subsequently, spacer compensation stage 224 can increase the light energy assigned to the neighboring sub-pixel regions to compensated light energy levels, which in turn compensates, at least partially, for the light energy value assigned to the spacer-occupied sub-pixel regions (which light energy is otherwise missing in pixel grid 101). Through this process, spacer compensation stage 224 generates a compensated sub-pixel map including the compensated light energy values for the neighboring pixel regions. Display device 100 then can display the compensated sub-pixel map on pixel grid 101.

Figure 11:
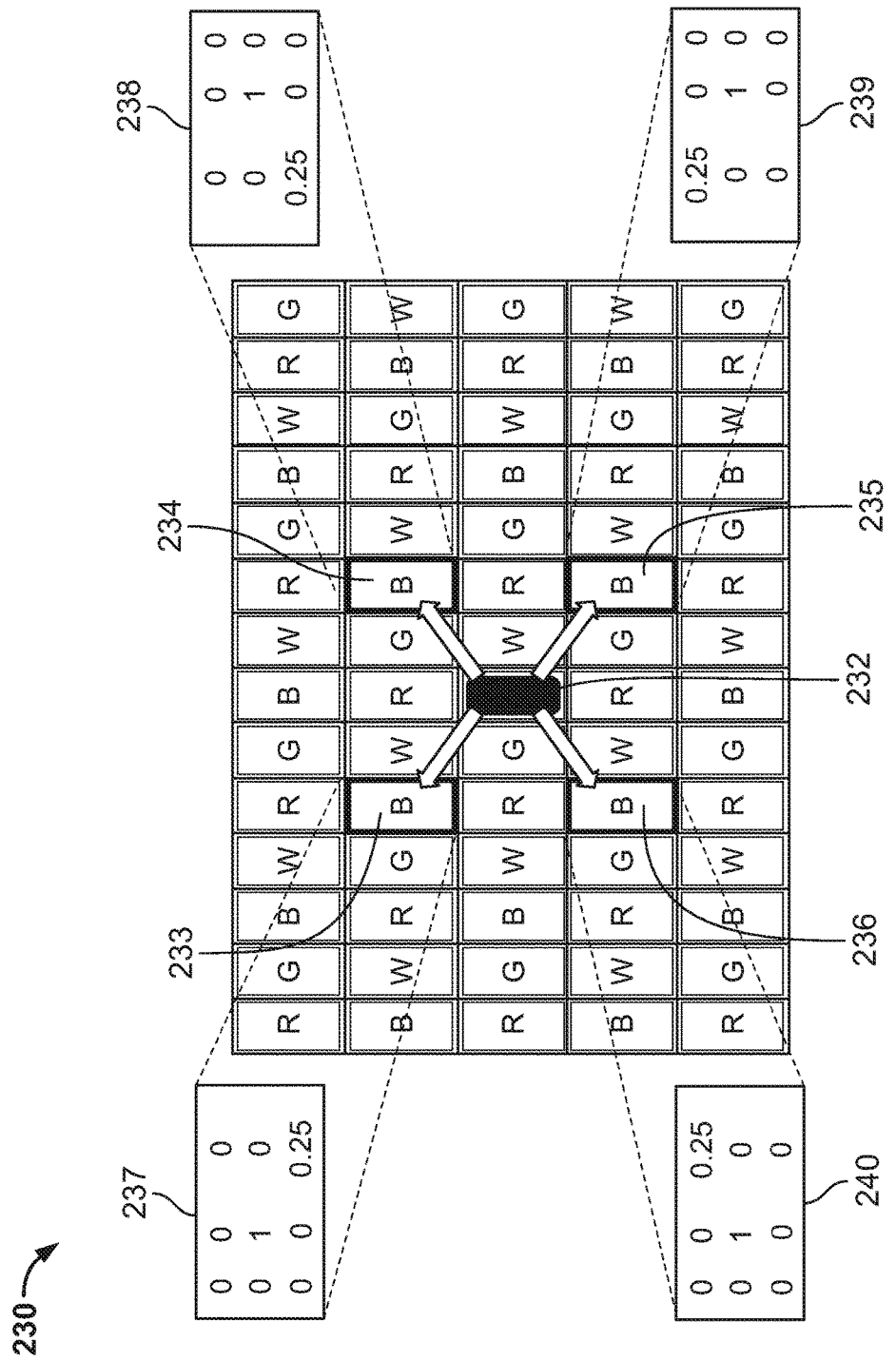
FIG. 11 is a top view of an electrowetting display illustrating a function of the pixel processing pipeline of FIG. 10, according to an example embodiment.

FIG. 11 provides an example illustration 230 of the operation of spacer compensation stage 224 in accordance with one embodiment. In the illustrated embodiment, the energy at blue sub-pixel region spacer location 232 is distributed to the nearest diagonal neighboring blue sub-pixel regions 233-236. In one embodiment, the energy is distributed equally to the nearest diagonal neighboring blue sub-pixels 233-236. Spacer compensation stage 224 thus can redistribute (or compensate for) the missing blue light energy at blue sub-pixel region spacer location 232 by applying positional filters 237-240 to each of diagonal neighboring blue sub-pixel regions 233-236, respectively.

As illustrated in example 230, positional filters 237-240 each show an example positional filter including a plurality of positional coefficients. The positional coefficients correspond to nearest neighboring sub-pixel regions of the sub-pixel region. For example, the positional coefficients of positional filter 237 correspond to the neighboring sub-pixel regions of sub-pixel region 233, including a positional coefficient corresponding to the sub-pixel region at blue sub-pixel region spacer location 232. The example positional filters take into account 100% of the sub-pixel region's own light energy value (as indicated by the positional coefficient "1" in the center) and also takes into account a percentage of the light energy from sub-pixel regions of the same color that neighbor the sub-pixel region being filtered (e.g., as indicated by the positional coefficients surrounding the central "1"). For example, positional filter 237 shows a positional coefficient "1" in the center (meaning that sub-pixel region 233 is to output 100% of its own assigned blue energy value) and a positional coefficient "0" for all the surrounding positions except for the lower right (meaning that sub-pixel region 233 is to also output 0% of the assigned blue energy for the neighboring sub-pixel region indicated by that direction). However, in this example, the lower right positional coefficient shows a "0.25", which means that sub-pixel region 233 is to also output 25% of the assigned blue energy for the neighboring sub-pixel region in the right and downward direction, in this case being the sub-pixel region at blue sub-pixel region spacer location 232. Thus, sub-pixel region 233 will output 100% of its assigned blue energy in addition to 25% of the blue energy assigned to the position of blue sub-pixel region spacer location 232. The other positional filters 238-240 operate in the same manner for their respective sub-pixel regions 234-236. In one embodiment, positional filters 237-240 operate in combination to account for 100% of the otherwise missing blue energy from blue sub-pixel region spacer location 232. As is shown in FIG. 11, the positional coefficient locations corresponding to blue sub-pixel region spacer location 232 in each of the positional filters 237-240 together add to "1" such that the four nearest diagonal neighboring blue sub-pixel regions 233-236 together output 100% of the blue light assigned to the location of blue sub-pixel region spacer location 232. In other embodiments, positional filters 237-240 may account for less or more than 100% of the missing light from the location of blue sub-pixel region spacer location 232.

Accordingly, as the logic of spacer compensation stage 224 operates on the pixel data set, the individual sub-pixel region position is detected for each sub-pixel region. When the positions for sub-pixel regions 233-236 are detected, corresponding positional filter 237-240, respectively, is applied to pull a portion of blue light energy from blue sub-pixel region spacer location 232 and add it to the current location (e.g., of sub-pixel regions 233-236).

Figure 12:
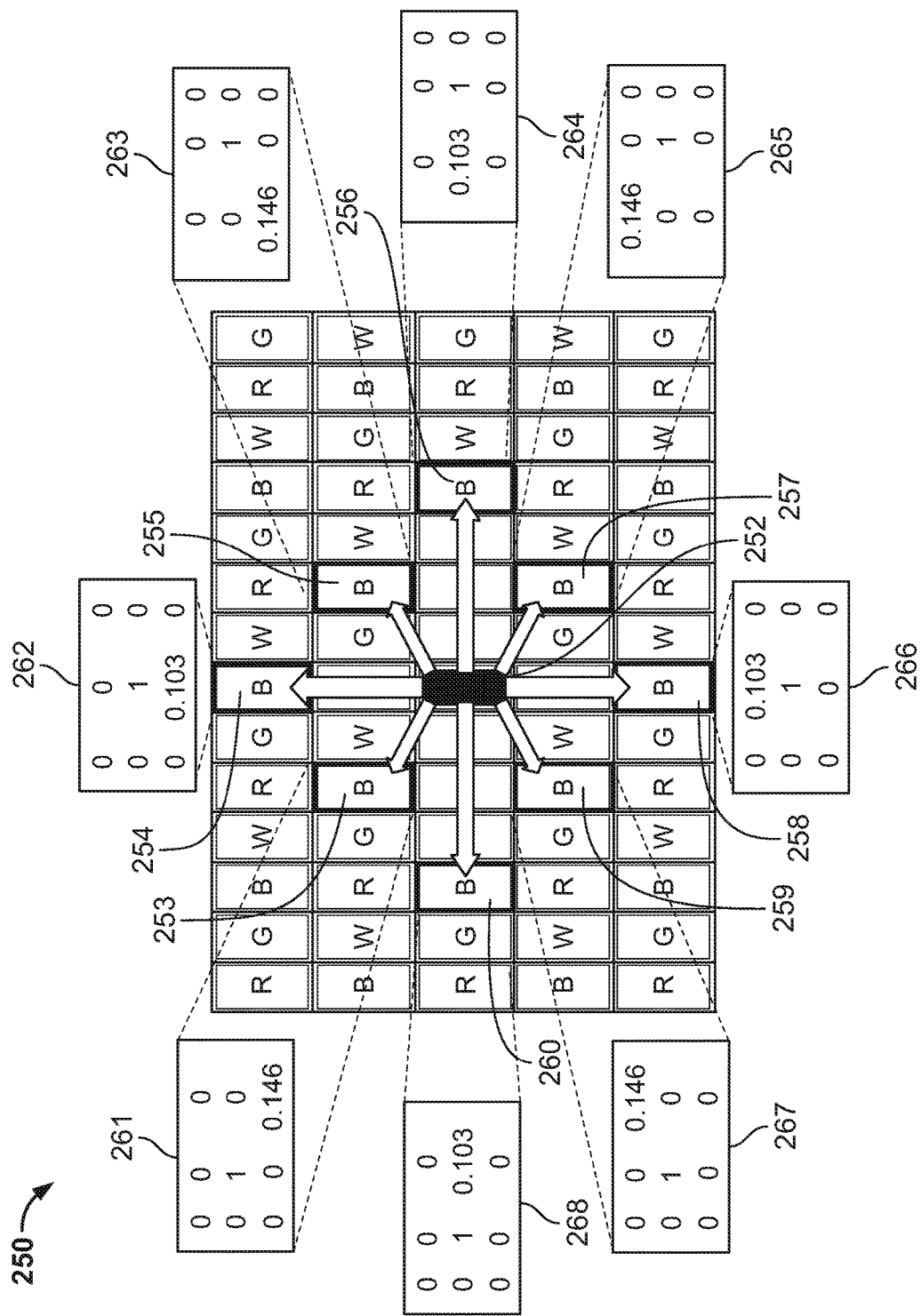
FIG. 12 is another top view of an electrowetting display illustrating a function of the pixel processing pipeline of FIG. 10, according to another example embodiment.

FIG. 12 illustrates an example variation 250 of example 230 provided in FIG. 11. FIG. 12 shows a broader redistribution of missing light energy that includes not only the four nearest diagonal neighboring blue sub-pixel regions 253, 255, 257, and 259, but also the four nearest orthogonal neighboring sub-pixel regions 254, 256, 258, and 260. In this example, the positional coefficient corresponding to sub-pixel region spacer 252 in each of the positional filters 261, 263, 265, and 267 for the four nearest diagonal neighboring blue sub-pixel regions 253, 255, 257, and 259, respectively, shows a value if "0.146." Similarly, the positional coefficient corresponding to sub-pixel region spacer 252 in each of the positional filters 262, 264, 266, and 268 for the four nearest orthogonal neighboring blue sub-pixel regions 254, 256, 258, and 260, respectively, shows a value if "0.103." Together, these eight positional coefficients add to "1" to account for 100% of the missing blue energy assigned to the location of sub-pixel region spacer 252.

In operation, in this example, spacer compensation stage 224 detects eight positions corresponding to sub-pixel regions 253-260 and applies positional filters 261-268 accordingly to redistribute energy. In one example, the positional coefficients of positional filters 261-268 are selected to be in proportion to the distance from sub-pixel region spacer 252. Many variations are possible for the selected positional coefficient values and the positional coefficient values provided are merely but one example implementation.

In various embodiments, the positional coefficients sum up to "1" to account for a complete redistribution of the missing energy at sub-pixel region spacer location 232 or 252. However, the positional coefficients for all the surrounding sub-pixel regions may add up to less than or more than "1" (to account for less than or more than all the missing light from the position of the sub-pixel region spacer 232 or 252). Further, although the example values for positional filters 237-240 and 261-268 are provided (including "1" as a central value implying 100% of the pre-filtered value assigned to that sub-pixel region), many variations for these values are possible. For example, the value assigned to the sub-pixel region's own energy may be above or below "1".

In various embodiments, the application of the positional filters to the particular sub-pixel regions can result in a value that exceeds the maximum grayscale value that the sub-pixel region can output. In one approach, the value is clamped to the maximum value allowed by the bit-depth of the display. In another approach, some or all of the expected value (resulting from the operation of the position filter) that exceeds the maximum allowed value for the sub-pixel region can be redistributed to some or all of the other sub-pixel regions that neighbor the sub-pixel region spacer location. For example, if the operation of positional filter 261 would result in an energy output value that exceeds the maximum output value that sub-pixel region 253 is capable of, the excess may be calculated and redistributed again to any of other sub-pixel regions 254-260, or, alternatively, only to sub-pixel regions nearest to sub-pixel region 253 (e.g., sub-pixel region 254 and sub-pixel region 260), or to other sub-pixel regions that surround sub-pixel region 253.

Although positional filters 237-240 in FIG. 11 and positional filters 261-268 in FIG. 12 are each illustrated showing only one level of neighboring sub-pixel regions (e.g., the nearest neighbors), the concept of redistribution can be extended and applied to multiple layers of sub-pixel regions (e.g., the blue sub-pixel region two or three to the right) rather than just to the nearest neighboring sub-pixel region. Further, the concept of redistribution can be extended to different directions rather than the directly diagonal or orthogonal neighboring sub-pixel regions. For example, the positional filters can also take into account neighboring sub-pixel regions that are one row over but two rows down. Moreover, although many of the examples disclosed herein describe the blue sub-pixel regions being replaced by a sub-pixel region spacer and subsequently applying spacer compensation stage 224 to the blue sub-pixel regions, the concepts disclosed herein can be extended to apply to any of the sub-pixel region colors or types. Many other variations are possible.

In an example embodiment, an electrowetting display device includes a first support plate and an opposing second support plate. A plurality of pixel wall portions is formed over the first support plate. The plurality of pixel wall portions forms a perimeter of an electrowetting pixel. A first spacer portion is positioned in the electrowetting pixel and a second spacer portion is coupled to the second support plate. The second spacer portion is coupled to the first spacer portion to form a spacer between the first support plate and the second support plate. In a particular embodiment, the first spacer portion has a height between a first end contacting a bottom surface of the electrowetting pixel and an opposing second end having a landing surface contacting a landing surface of the second spacer portion equal to a height of each of the plurality of pixel wall portions between a first end contacting the bottom surface of the electrowetting pixel and an opposing second end. In this embodiment, the electrowetting pixel has a rectangular cross-sectional area and the first spacer portion comprises a plurality of walls. Each wall of the plurality of walls contacts a corresponding pixel wall portion of the plurality of pixel wall portions forming the perimeter of the electrowetting pixel.

In another example embodiment, a display device includes a first support plate and an opposing second support plate. A plurality of pixel regions is formed between the first support plate and the second support plate. Each of the plurality of pixel regions includes a pixel having a plurality of pixel wall portions forming a perimeter of the pixel. A spacer is positioned within a first pixel region of the plurality of pixel regions. The first pixel region includes a first pixel. The spacer has a first spacer portion in the first pixel and a second spacer portion extending from the second support plate within the first pixel region and coupled to the first spacer portion. In a particular embodiment, a second pixel region of the plurality of pixel regions is positioned at a distance from the first pixel region. The second pixel region includes a second pixel having a plurality of pixel wall portions forming a perimeter of the second pixel. An additional spacer extends from the second support plate within the second pixel region to contact a first pixel wall portion of the plurality of pixel wall portions forming the perimeter of the second pixel.

In an example embodiment, the first pixel region comprises a plurality of sub-pixel regions. Each of the plurality of sub-pixel regions includes a sub-pixel having a plurality of pixel wall portions forming a perimeter of the sub-pixel. The first spacer portion is positioned within a first sub-pixel of a first sub-pixel region and extends between the plurality of pixel wall portions to fill the first sub-pixel. The second spacer portion extends from the second support plate within the first sub-pixel region to contact the first spacer portion. The plurality of sub-pixel regions includes a second sub-pixel region having a second sub-pixel. A first liquid is disposed in the second sub-pixel and a second liquid, which is immiscible with the first liquid, is disposed within the second sub-pixel region. In this embodiment, the second sub-pixel region is one of a red sub-pixel region, a green sub-pixel region, or a white sub-pixel region. A second pixel region is positioned at a distance from the first pixel region at a suitable spacer pitch. The second pixel region includes a second pixel having a plurality of pixel wall portions forming a perimeter of the second pixel. A second spacer is positioned within the second pixel region. The second spacer has a first spacer portion in the second pixel and a second spacer portion extending from the second support plate within the second pixel region and coupled to the first spacer portion. Each of the first pixel and the second pixel includes two sub-pixels, and the second pixel region is positioned with respect to the first pixel region at a pitch of at least 2 and, more particularly, at a pitch of at least 6. In this embodiment, each of the first pixel and the second pixel has a first sub-pixel including the first spacer portion and a second sub-pixel including a white sub-pixel. A third pixel region is adjacent the first pixel region in a row of pixel regions. The third pixel region includes a red sub-pixel and a green sub-pixel.

In an example embodiment, an electrowetting display device includes a first support plate and an opposing second support plate. A plurality of pixel wall portions are formed or positioned over the first support plate. The plurality of pixel wall portions form a perimeter of an electrowetting sub-pixel region. A first spacer portion is disposed within the plurality of pixel wall portions in the electrowetting sub-pixel region. The first spacer portion adjoins the plurality of pixel wall portions and has a first landing surface extending between the plurality of pixel wall portions. A second spacer portion is formed or positioned in the electrowetting sub-pixel region and extends from the second support plate. The second spacer portion includes a second landing surface coupled to the first landing surface to form a sub-pixel region spacer between the first support plate and the second support plate. A hydrophobic layer may be positioned over the first support plate. The hydrophobic layer has a surface positioned within the electrowetting sub-pixel region, wherein the first spacer portion has a height between a first end contacting the surface of the hydrophobic layer and the first landing surface equal to a height of each pixel wall portion of the plurality of pixel wall portions between a first end contacting the surface of the hydrophobic layer and an opposing second end of each pixel wall portion.

The plurality of pixel wall portions may form a perimeter of an additional electrowetting sub-pixel region positioned at a pitch of at least 2 from the electrowetting sub-pixel region. The electrowetting display device includes an additional sub-pixel region spacer positioned in the additional electrowetting sub-pixel region. The additional sub-pixel region spacer includes a first spacer portion adjoining the plurality of pixel wall portions forming the perimeter of the additional electrowetting sub-pixel region. The first spacer portion has a first landing surface extending between the plurality of pixel walls. A second spacer portion is formed or positioned in the additional electrowetting sub-pixel region and extends from the second support plate. The second spacer portion includes a second landing surface coupled to the first landing surface.

In another example embodiment, a display device includes a first support plate and an opposing second support plate. A plurality of pixel regions is formed between the first support plate and the second support plate. Each of the plurality of pixel regions includes a plurality of sub-pixel regions. A plurality of pixel wall portions is formed over the first support plate. The plurality of pixel wall portions form a perimeter of each of the plurality of sub-pixel regions. A sub-pixel region spacer is positioned in a first sub-pixel region of the plurality of sub-pixel regions. The sub-pixel region spacer includes a first spacer portion in the first sub-pixel region having a first landing surface extending between the plurality of pixel wall portions forming the perimeter of the first sub-pixel region. A second spacer portion extends from the second support plate in the first pixel region and is coupled to the first spacer portion. A hydrophobic layer has a surface positioned within the sub-pixel region, wherein the first landing surface is positioned at a height above the surface of the hydrophobic layer substantially equal to a height of each pixel wall portion of the plurality of pixel wall portions between a first end contacting the surface of the hydrophobic layer and an opposing second end of each pixel wall portion. Each of the plurality of pixel wall portions forming the perimeter of the first sub-pixel region has a contact surface, and the first landing surface is substantially coplanar with the contact surface of each of the pixel wall portions. The plurality of pixel wall portions form a perimeter of a second sub-pixel region of the plurality of sub-pixel regions. The display device may include a spacer extending from the second support plate and contacting a first pixel wall portion of the plurality of pixel wall portions forming the perimeter of the second sub-pixel region.

A first pixel region of the plurality of pixel regions may include the first sub-pixel region and a second sub-pixel region of the plurality of sub-pixel regions adjacent the first sub-pixel region. The display device includes a first liquid disposed in the second sub-pixel region and a second liquid that is immiscible with the first liquid, the second liquid disposed within the second sub-pixel region. One of a red color filter, a green color filter or a transparent color filter may be positioned in the second sub-pixel region.

A first pixel region of the plurality of pixel regions may include the first sub-pixel region and a second pixel region of the plurality of pixel regions may include a second sub-pixel region positioned at a pitch of at least 2 from the first sub-pixel region. In this embodiment, the display device includes an additional sub-pixel region spacer positioned in the second sub-pixel region. The first pixel region includes a second sub-pixel region adjacent the first sub-pixel region. A transparent color filter may be positioned in the second sub-pixel region.

The pixel walls and the spacers in the present disclosure may be formed using any suitable fabrication process. In one embodiment, during fabrication of the electrowetting display device, lithography employing diffractive masks can be utilized to form the pixel walls and the spacers.

Figure 13:
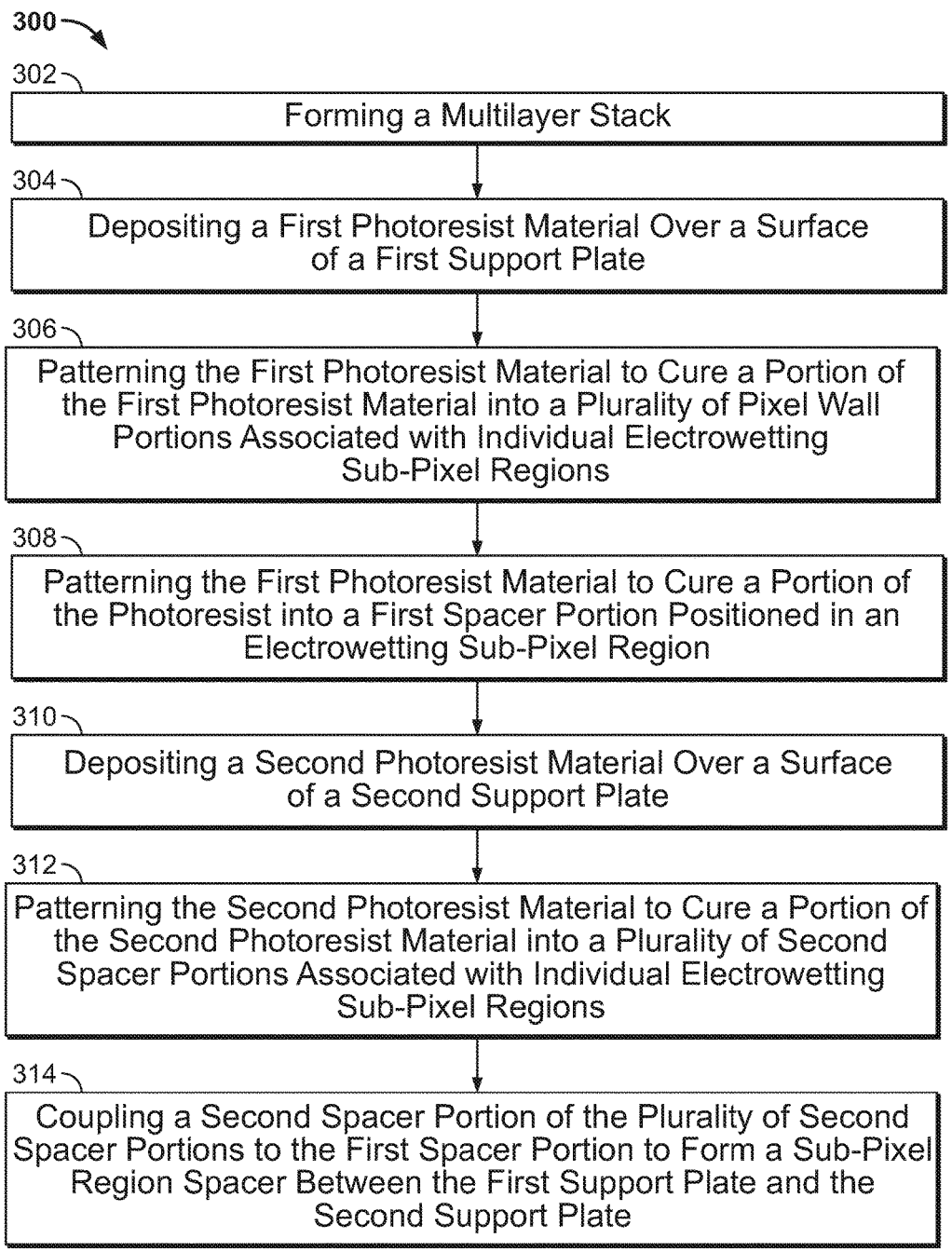
FIG. 13 illustrates an example embodiment for fabricating an example electrowetting display device.

FIG. 13 is a flow diagram of a process 300 for fabricating an electrowetting display device, according to various embodiments. For example, the display device may employ a pixel wall and spacer configuration such as shown in FIGS. 1 and 2. Though claimed subject matter is not limited in this respect, process 300 may be performed manually (e.g., by humans) and/or using automatic equipment. At block 302, a multilayer stack is first formed. The multilayer stack includes a first conductive layer deposited on a first support plate. In one embodiment, the first conductive layer is indium tin oxide (ITO), although in alternative embodiments the first conductive layer may be another suitable material. Deposition techniques include, for example, chemical vapor deposition (CVD), physical vapor deposition (PVD), molecular beam epitaxy (MBE), and sputtering. The first support plate may be the same as or similar to bottom support plate 104 shown in FIGS. 1 and 2.

The multilayer stack includes a first dielectric layer deposited on the first conductive layer. The first dielectric layer may comprise SiN, SiON, SiO, or TaO, for example. Any suitable deposition technique may be used, such as CVD, PVD, MBE, and a sputtering, for example. A hydrophobic layer (e.g., hydrophobic layer 122, shown in FIGS. 1 and 2) may be deposited over the patterned first dielectric layer.

At block 304, a first photoresist material is deposited over a surface of a first support plate, e.g., bottom support plate 104. In one embodiment, the first photoresist material is deposited on the multilayer stack and at block 306 the first photoresist material is patterned using a suitable mask to cure a portion of the first photoresist material to form a patterned photoresist layer. The patterned photoresist layer is developed to form a plurality of pixel wall portions associated with individual electrowetting sub-pixel regions. For example, a first electrowetting sub-pixel region includes a plurality of pixel wall portions forming a perimeter of the first sub-pixel region. At block 306, the first photoresist material is exposed to a first diffractive mask to form the pixel wall portions. More specifically, in a particular embodiment, a first diffractive mask, such as a dark field diffractive mask, is positioned over the first photoresist material and the first photoresist material is exposed to light through the first diffractive mask. The first diffractive mask includes a pattern of non-transparent material configured to disperse light passing through the first diffractive mask to pattern a first portion of the first photoresist material. The first portion of the patterned first photoresist material is developed to form a plurality of pixel wall portions forming a perimeter of an electrowetting sub-pixel region. In alternative embodiments, these structures may be printed using suitable methods other than photolithography, including, without limitation, direct writing and electron beam lithography (EBL).

The first photoresist material is also patterned 308 to cure a portion of the photoresist material into a first spacer portion positioned in the first electrowetting sub-pixel region. In this embodiment, the first spacer portion includes a plurality of walls. Each wall of the plurality of walls contacts a corresponding pixel wall portion of the plurality of pixel wall portions forming the perimeter of the first electrowetting pixel. In one embodiment, the first photoresist material is exposed to light through a second diffractive mask. The second diffractive mask includes a pattern of non-transparent material configured to disperse light passing through the second diffractive mask to pattern a second portion of the first photoresist material. The second portion of the patterned first photoresist material is developed to form a first spacer portion positioned in the electrowetting sub-pixel region. The first spacer portion has a first landing surface extending between the plurality of pixel wall portions forming the perimeter of the electrowetting sub-pixel region. In an alternative embodiment, the first photoresist material can be patterned using one mask to form the plurality of pixel wall portions and a plurality of first spacer portions within selected electrowetting pixels.

To form the sub-pixel region spacers, a second photoresist material is deposited 310 over a surface of a second support plate, e.g., top support plate 114. In one embodiment, the second photoresist material is the same or similar to the first photoresist material. For example, the first photoresist material and the second photoresist material may be an epoxy-based negative photoresist material SU-8. The second photoresist material is patterned 312 through the diffractive mask to cure a portion of the photoresist material to form a patterned photoresist layer. The patterned photoresist layer is developed to form a plurality of second spacer portions associated with individual electrowetting sub-pixel regions. A second spacer portion of the plurality of second spacer portions is coupled 314 to the corresponding first spacer portion to form a sub-pixel region spacer between the first support plate and the second support plate. In one embodiment, the second photoresist is exposed to light through a third diffractive mask. The third diffractive mask includes a pattern of non-transparent material configured to disperse light passing through the third diffractive mask to pattern a first portion of the second photoresist material. The first portion of the patterned second photoresist material is developed to form a second spacer portion associated with the electrowetting sub-pixel region. The second spacer portion is coupled to the first spacer portion to form a sub-pixel region spacer between the first support plate and the second support plate. In a particular embodiment, the second photoresist material is patterned to cure a portion of the second photoresist material into a plurality of additional spacers associated with individual electrowetting pixels. Each additional spacers of the plurality of additional spacers is coupled to a corresponding pixel wall portion of the plurality of pixel wall portions forming a perimeter of a respective electrowetting pixel. In one embodiment, the second photoresist material is exposed to light through a fourth diffractive mask. The fourth diffractive mask includes a pattern of non-transparent material configured to disperse light passing through the fourth diffractive mask to pattern a second portion of the second photoresist material. The second portion of the patterned second photoresist material is developed to form a spacer associated with an additional electrowetting sub-pixel region. The spacer is coupled to a corresponding pixel wall portion of a plurality of pixel wall portions forming a perimeter of the additional electrowetting sub-pixel region. Following formation of the pixel wall portions, a reflow process may be utilized to modify the hydrophobicity of the hydrophobic layer before an ultraviolet (UV) ozone process is utilized to make the pixel wall portions hydrophilic. The dosing used during the UV ozone processing is determined by the shape and size of the pixel wall portions. The hydrophilic nature of the pixel wall portions following UV ozone processing results in an electrolyte pinning effect. After UV ozone processing, the first liquid and the second liquid (e.g., the oil and the electrolyte solution) are disposed within the electrowetting pixel regions of the electrowetting display device. The electrowetting display device is then be capped by a second support plate.

After forming a plurality of pixel walls and a plurality of first spacer portions on the first support plate and forming a plurality of second spacer portions on the second support plate, the distal end of each second spacer portion is aligned to contact the distal end of a corresponding first spacer portion to at least partially define electrowetting pixel regions and the second support plate is coupled to the first support plate.

Figure 14:
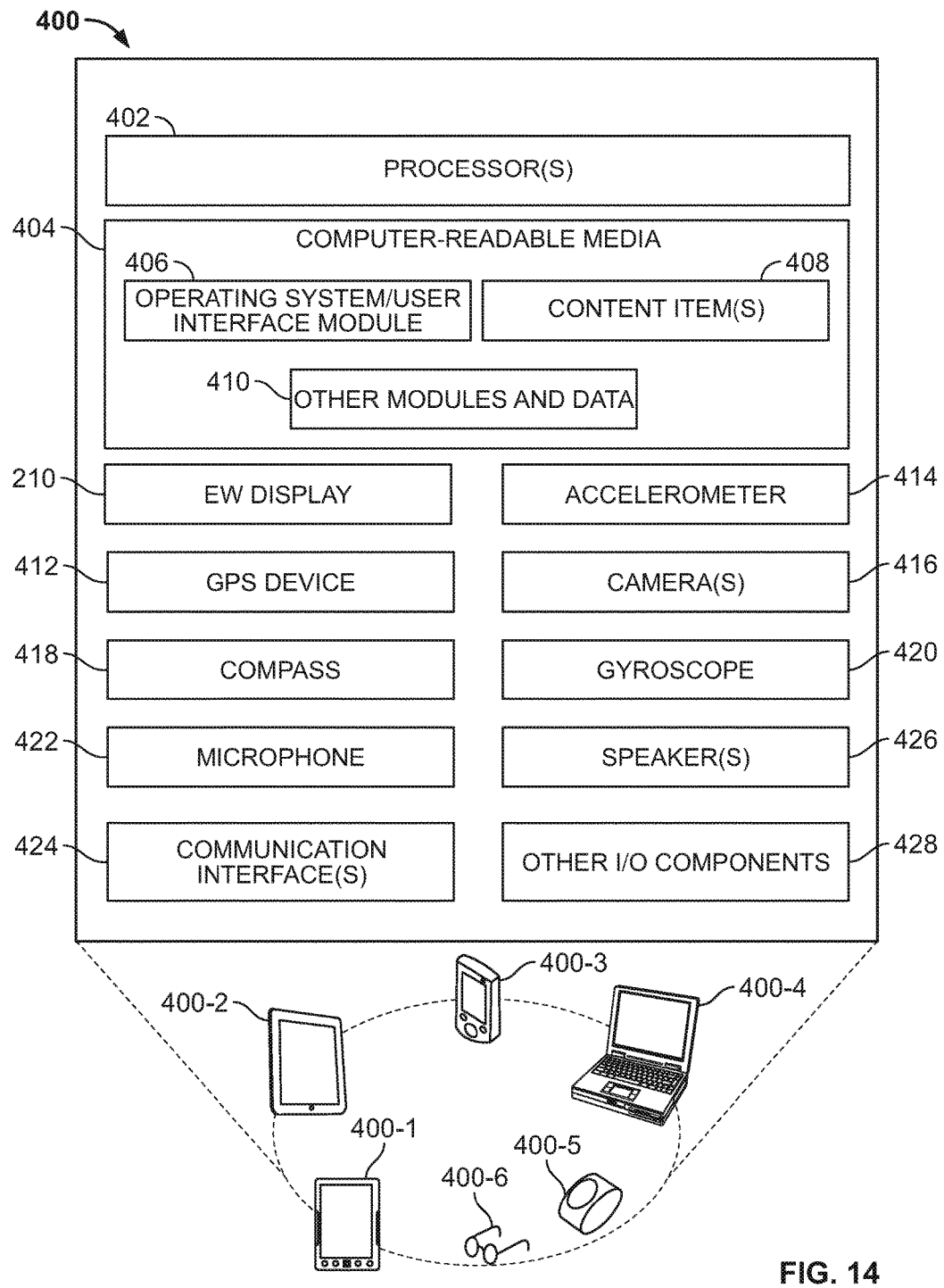
FIG. 14 illustrates an example electronic device that may incorporate an electrowetting display device, according to example embodiments.

FIG. 14 illustrates an example electrowetting display device 400 that may incorporate any of the display devices discussed above. FIG. 14 illustrates select example components of an example image display apparatus 400 that may be used with electrowetting display device 100 according to certain embodiments. Other types of displays may also be used with example image display apparatus 400. Such types of displays include, without limitation, LCDs, cholesteric displays, electrophoretic displays, electrofluidic pixel displays, photonic ink displays, and the like.

Image display apparatus 400 may be implemented as any of a number of different types of electronic devices. Some examples of the image display apparatus 400 may include digital media devices and eBook readers 400-1; tablet computing devices 400-2; smart phones, mobile devices and portable gaming systems 400-3; laptop and netbook computing devices 400-4; wearable computing devices 400-5; augmented reality devices, helmets, goggles or glasses 400-6; and any other device capable of connecting with electrowetting display device 100 and including a processor and memory for controlling the display according to the techniques described herein.

In a very basic configuration, image display apparatus 400 includes, or accesses, components such as at least one control logic circuit, central processing unit, or processor 402, and one or more computer-readable media 404. Each processor 402 may itself comprise one or more processors or processing cores. For example, processor 402 can be implemented as one or more microprocessors, microcomputers, microcontrollers, digital signal processors, central processing units, state machines, logic circuitries, and/or any devices that manipulate signals based on operational instructions. In some cases, processor 402 may be one or more hardware processors and/or logic circuits of any suitable type specifically programmed or configured to execute the algorithms and processes described herein. Processor 402 can be configured to fetch and execute computer-readable instructions stored in computer-readable media 404 or other computer-readable media. Processor 402 can perform one or more of the functions attributed to timing controller 202, source or source driver 204, and/or gate driver 206 of electrowetting display device 100. Processor 402 can also perform one or more functions attributed to a graphic controller (not illustrated) for the electrowetting display device.

Depending on the configuration of image display apparatus 400, computer-readable media 404 may be an example of tangible non-transitory computer storage media and may include volatile and nonvolatile memory and/or removable and non-removable media implemented in any type of technology for storage of information such as computer-readable instructions, data structures, program modules or other data. Computer-readable media 404 may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, image display apparatus 400 may access external storage, such as RAID storage systems, storage arrays, network attached storage, storage area networks, cloud storage, or any other medium that can be used to store information and that can be accessed by processor 402 directly or through another computing device or network. Accordingly, computer-readable media 404 may be computer storage media able to store instructions, modules or components that may be executed by processor 402.

Computer-readable media 404 may be used to store and maintain any number of functional components that are executable by processor 402. In some implementations, these functional components comprise instructions or programs that are executable by processor 402 and that, when executed, implement operational logic for performing the actions attributed above to image display apparatus 400. Functional components of image display apparatus 400 stored in computer-readable media 404 may include the operating system and user interface module 406 for controlling and managing various functions of image display apparatus 400, and for generating one or more user interfaces on electrowetting display device 100 of image display apparatus 400.

In addition, computer-readable media 404 may also store data, data structures and the like, that are used by the functional components. For example, data stored by computer-readable media 404 may include user information and, optionally, one or more content items 408. Depending on the type of image display apparatus 400, computer-readable media 404 may also optionally include other functional components and data, such as other modules and data 410, which may include programs, drivers and so forth, and the data used by the functional components. Further, image display apparatus 400 may include many other logical, programmatic and physical components, of which those described are merely examples that are related to the discussion herein. Further, while the figures illustrate the functional components and data of image display apparatus 400 as being present on image display apparatus 400 and executed by processor 402 on image display apparatus 400, it is to be appreciated that these components and/or data may be distributed across different computing devices and locations in any manner.

FIG. 14 further illustrates examples of other components that may be included in image display apparatus 400. Such examples include various types of sensors, which may include, for example, a GPS device 412, an accelerometer 414, one or more cameras 416, a compass 418, a gyroscope 420, and/or a microphone 422.

Image display apparatus 400 may further include one or more communication interfaces 424, which may support both wired and wireless connection to various networks, such as cellular networks, radio, Wi-Fi networks, close-range wireless connections, near-field connections, infrared signals, local area networks, wide area networks, the Internet, and so forth. Communication interfaces 424 may further allow a user to access storage on or through another device, such as a remote computing device, a network attached storage device, cloud storage, or the like.

Image display apparatus 400 may further be equipped with one or more speakers 426 and various other input/output (I/O) components 428. Such I/O components 428 may include, without limitation, a touchscreen and various user controls (e.g., buttons, a joystick, a keyboard, and/or a keypad), a haptic or tactile output device, connection ports, and/or physical condition sensors. For example, operating system 406 of image display apparatus 400 may include suitable drivers configured to accept input from a keypad, keyboard, or other user controls and devices included as I/O components 428. Additionally, image display apparatus 400 may include various other components that are not illustrated, examples of which include removable storage, a power source, such as a battery and power control unit, and a PC Card component.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. An electrowetting display device, comprising:
a first support plate and an opposing second support plate;
a plurality of pixel wall portions over the first support plate, the plurality of pixel wall portions forming a perimeter of a surface of an electrowetting sub-pixel region;
a first spacer portion disposed within the plurality of pixel wall portions in the electrowetting sub-pixel region, the first spacer portion adjoining the plurality of pixel wall portions, the first spacer portion on the surface of the electrowetting sub-pixel region and having a first landing surface extending between the plurality of pixel wall portions; and
a second spacer portion in the electrowetting sub-pixel region and extending from the second support plate, the second spacer portion including a second landing surface coupled to the first landing surface to form a sub-pixel region spacer between the first support plate and the second support plate.

2. The electrowetting display device of claim 1, further comprising a hydrophobic layer positioned over the first support plate, the hydrophobic layer having a surface positioned within the electrowetting sub-pixel region, wherein the first spacer portion has a height between a first end contacting the surface of the hydrophobic layer and the first landing surface equal to a height of each pixel wall portion of the plurality of pixel wall portions between a first end contacting the surface of the hydrophobic layer and an opposing second end of each pixel wall portion.

3. The electrowetting display device of claim 1, wherein the plurality of pixel wall portions form a perimeter of an additional electrowetting sub-pixel region positioned at a pitch of at least 2 from the electrowetting sub-pixel region, the electrowetting display device further comprising an additional sub-pixel region spacer positioned in the additional electrowetting sub-pixel region, the additional sub-pixel region spacer including:
a first spacer portion adjoining the plurality of pixel wall portions forming the perimeter of the additional electrowetting sub-pixel region, the first spacer portion having a first landing surface extending between the plurality of pixel walls; and
a second spacer portion in the additional electrowetting sub-pixel region and extending from the second support plate, the second spacer portion including a second landing surface coupled to the first landing surface.

4. A display device, comprising:
a first support plate and an opposing second support plate;
a plurality of pixel regions between the first support plate and the second support plate, each of the plurality of pixel regions including a plurality of sub-pixel regions;
a plurality of pixel wall portions over the first support plate, the plurality of pixel wall portions forming a perimeter of a surface in each of the plurality of sub-pixel regions; and
a sub-pixel region spacer positioned in a first sub-pixel region of the plurality of sub-pixel regions, the sub-pixel region spacer including:
a first spacer portion in the first sub-pixel region on a surface of the first sub-pixel region, the first spacer portion having a first landing surface extending between the plurality of pixel wall portions forming the perimeter of the surface of the first sub-pixel region; and
a second spacer portion extending from the second support plate in the first pixel region and coupled to the first spacer portion.

5. The display device of claim 4, further comprising a hydrophobic layer having a surface positioned within the sub-pixel region, wherein the first landing surface is positioned at a height above the surface of the hydrophobic layer substantially equal to a height of each pixel wall portion of the plurality of pixel wall portions between a first end contacting the surface of the hydrophobic layer and an opposing second end of each pixel wall portion.

6. The display device of claim 4, wherein each of the plurality of pixel wall portions forming the perimeter of the first sub-pixel region has a contact surface, and the first landing surface is substantially coplanar with the contact surface of each of the pixel wall portions.

7. The display device of claim 4, wherein the plurality of pixel wall portions form a perimeter of a second sub-pixel region of the plurality of sub-pixel regions, the display device further comprising a spacer extending from the second support plate and contacting a first pixel wall portion of the plurality of pixel wall portions forming the perimeter of the second sub-pixel region.

8. The display device of claim 4, wherein a first pixel region of the plurality of pixel regions comprises the first sub-pixel region and a second sub-pixel region of the plurality of sub-pixel regions adjacent the first sub-pixel region, the display device further comprising:
a first liquid disposed in the second sub-pixel region; and
a second liquid that is immiscible with the first liquid, the second liquid disposed within the second sub-pixel region.

9. The display device of claim 8, further comprising one of a red color filter, a green color filter or a transparent color filter in the second sub-pixel region.

10. The display device of claim 4, wherein a first pixel region of the plurality of pixel regions includes the first sub-pixel region and a second pixel region of the plurality of pixel regions includes a second sub-pixel region positioned at a pitch of at least 2 from the first sub-pixel region, the display device further comprising an additional sub-pixel region spacer positioned in the second sub-pixel region.

11. The display device of claim 10, wherein the first pixel region comprises a second sub-pixel region adjacent the first sub-pixel region.

12. The display device of claim 11, further comprising a transparent color filter positioned in the second sub-pixel region.

13. A display device, comprising:
  a first support plate and an opposing second support plate;
  a pixel region between the first support plate and the second support plate, the pixel region including a plurality of sub-pixel regions;
  a plurality of pixel wall portions over the first support plate, the plurality of pixel wall portions forming a perimeter and defining a surface of a first sub-pixel region of the plurality of sub-pixel regions; and
  a sub-pixel region spacer positioned on the surface of the first sub-pixel region, the sub-pixel region spacer including:
    a first spacer portion in the first sub-pixel region having a first landing surface extending between the plurality of pixel wall portions forming the perimeter of the first sub-pixel region; and
    a second spacer portion extending from the second support plate in the first pixel region and coupled to the first spacer portion.

14. The display device of claim 13, further comprising a hydrophobic layer having a surface positioned within the first sub-pixel region, wherein the first landing surface is positioned at a height above the surface of the hydrophobic layer substantially equal to a height of each pixel wall portion of the plurality of pixel wall portions between a first end contacting the surface of the hydrophobic layer and an opposing second end of each pixel wall portion.

15. The display device of claim 13, wherein each of the plurality of pixel wall portions forming the perimeter of the first sub-pixel region has a contact surface, and the first landing surface is substantially coplanar with the contact surface of each of the pixel wall portions.

16. The display device of claim 13, wherein the plurality of pixel wall portions form a perimeter of a second sub-pixel region of the plurality of sub-pixel regions, the display device further comprising a spacer extending from the second support plate and contacting a first pixel wall portion of the plurality of pixel wall portions forming the perimeter of the second sub-pixel region.

17. The display device of claim 13, wherein the pixel region comprises a second sub-pixel region of the plurality of sub-pixel regions adjacent the first sub-pixel region, the display device further comprising:
  a first liquid disposed in the second sub-pixel region; and
  a second liquid that is immiscible with the first liquid, the second liquid disposed within the second sub-pixel region.

18. The display device of claim 17, further comprising one of a red color filter, a green color filter, or a transparent color filter in the second sub-pixel region.

19. The display device of claim 13, further comprising an additional pixel region between the first support plate and the second support plate, the additional pixel region including a second sub-pixel region positioned at a pitch of at least 2 from the first sub-pixel region, the display device further comprising an additional sub-pixel region spacer positioned in the second sub-pixel region.

20. The display device of claim 19, wherein the first pixel region comprises a third sub-pixel region adjacent the first sub-pixel region.

21. The display device of claim 20, further comprising a transparent color filter positioned in the third sub-pixel region.

* * * * *